(12) United States Patent
Kumar et al.

(10) Patent No.: US 12,298,430 B1
(45) Date of Patent: May 13, 2025

(54) RADAR UNIT TEMPERATURE GAIN CONTROL

(71) Applicant: Amazon Technologies, Inc., Seattle, WA (US)

(72) Inventors: Karthik Kumar, Seattle, WA (US); Morris Yuanhsiang Hsu, Mountain View, CA (US); Tianchen Li, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 467 days.

(21) Appl. No.: 17/653,271

(22) Filed: Mar. 2, 2022

(51) Int. Cl.
*G01S 7/40* (2006.01)
*G05D 23/19* (2006.01)

(52) U.S. Cl.
CPC .............. *G01S 7/40* (2013.01); *G01S 7/4017* (2013.01); *G05D 23/1917* (2013.01)

(58) Field of Classification Search
CPC ...... G01S 7/40; G01S 7/4017; G05D 23/1917
See application file for complete search history.

(56) References Cited

U.S. PATENT DOCUMENTS

| | | | | |
|---|---|---|---|---|
| 5,570,304 A | * | 10/1996 | Mark | G01C 21/183 703/7 |
| 6,121,919 A | * | 9/2000 | Ameen | G01S 7/4021 342/174 |
| 2015/0192662 A1 | * | 7/2015 | Hesse | G01S 7/4004 342/195 |
| 2019/0080886 A1 | * | 3/2019 | Kaplan | H05B 6/686 |
| 2020/0200868 A1 | * | 6/2020 | Meier | H01Q 1/02 |
| 2020/0271753 A1 | * | 8/2020 | Va | G01S 7/038 |
| 2021/0156958 A1 | * | 5/2021 | Mazeau | G01S 13/882 |
| 2022/0034998 A1 | * | 2/2022 | Lombardo | G01S 7/40 |
| 2022/0187136 A1 | * | 6/2022 | Kostrzewa | G01J 5/90 |

FOREIGN PATENT DOCUMENTS

| | | | |
|---|---|---|---|
| CN | 107402384 A | * | 11/2017 |
| CN | 208284610 U | * | 12/2018 |
| CN | 209640742 U | * | 11/2019 |
| CN | 113970726 A | * | 1/2022 |
| JP | 2021124296 A | * | 8/2021 |
| WO | WO-2018045845 A1 | * | 3/2018 |

\* cited by examiner

*Primary Examiner* — Vladimir Magloire
*Assistant Examiner* — Maxine Mckenzie Phillips
(74) *Attorney, Agent, or Firm* — Lowenstein Sandler LLP

(57) ABSTRACT

Technologies for temperature gain control on radar units are described. A method includes determining a first value for an internal operating temperature corresponding to a steady-state of a radar unit. The method further includes causing the radar unit to operate in a first mode that heats the radar unit. The method further includes obtaining a second value for the internal operating temperature at a first time in the first mode and determining a third value indicating a measurement bias associated with the radar unit. The method further includes determining a fourth value using the second value and the third value. The fourth value indicates an updated internal operating temperature of the radar unit. The method further includes determining that the fourth value satisfies a threshold temperature condition corresponding to the first value. The method further includes causing the radar unit to stop operating in the first mode.

20 Claims, 8 Drawing Sheets

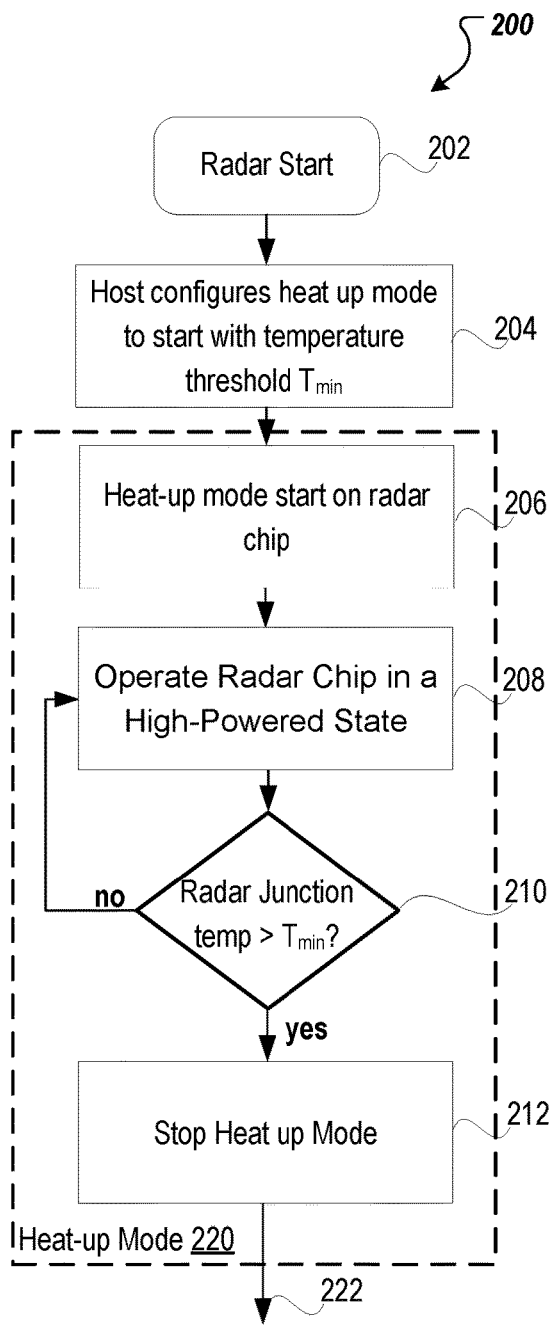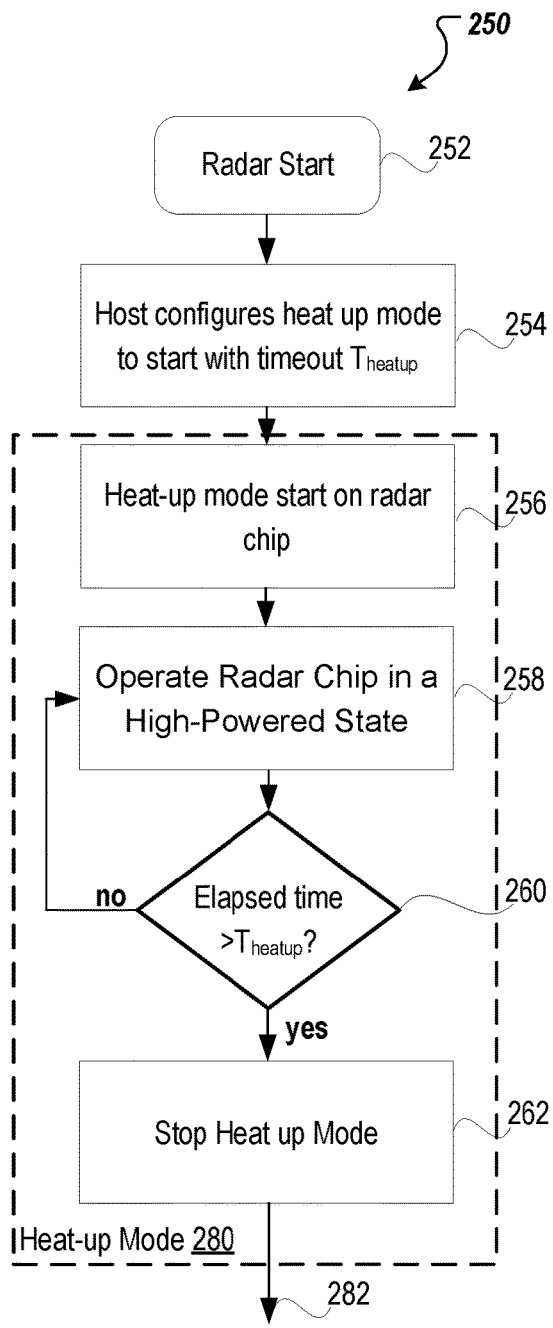
FIG. 2A                    FIG. 2B

RADAR UNIT TEMPERATURE GAIN CONTROL

BACKGROUND

Monitoring devices can be used to track a user's activity. Some monitoring devices are used to track a user's breathing activity and patterns while the user sleeps. The respiratory activity tracking can be used to identify sleep patterns (e.g., generate sleep scores and hypnograms) and monitor issues relating to cardiovascular or respiratory diseases or conditions. The monitoring device is typically positioned next to the user's bed (e.g., on a nightstand adjacent to the bed) and uses radar to detect movement within a detection zone to identify a respiratory waveform of a user. Monitoring devices can use radar sensors to detect the range, velocity, and identity of objects in motion. Radar sensors were originally designed for military and flight applications, but have more recently been manufactured as systems-on-a-chip in smaller form factors, making them adaptable for a wider range of commercial applications.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

FIG. 2A depicts a flow diagram of a process for a heat-up mode of a radar unit using a target temperature threshold, according to at least one embodiment of the present disclosure.

FIG. 2B depicts a flow diagram of a process for a heat-up mode of a radar unit using a time duration threshold, according to at least one embodiment of the present disclosure.

DETAILED DESCRIPTION

Figure 1:
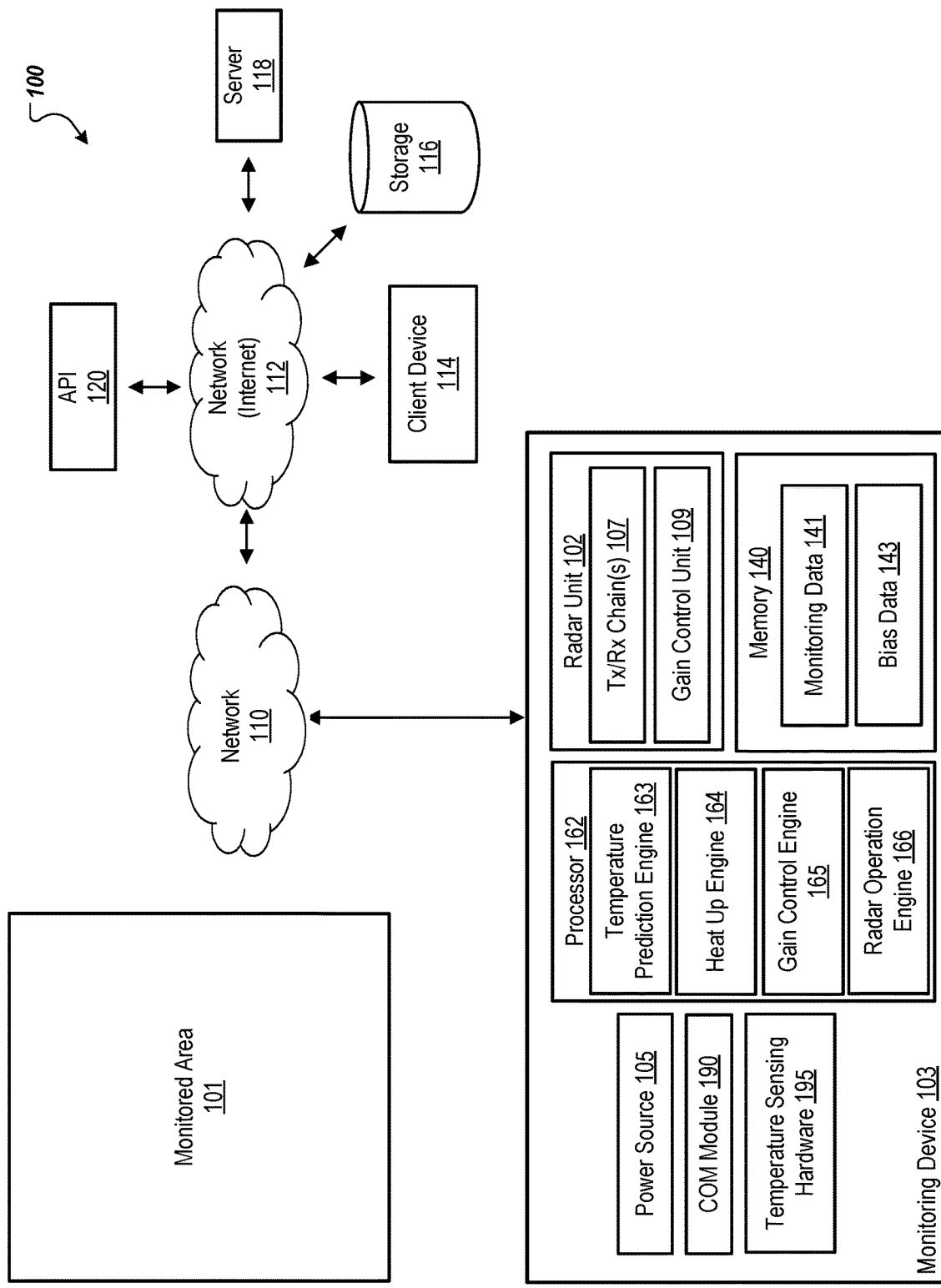
FIG. 1 depicts a temperature gain control system including a monitoring device with a radar unit, according to at least one embodiment of the present disclosure.

Technologies for improving internal operating temperature accuracy of a temperature gain control system for a radar unit (sometimes referred to as a radar chip, radar circuitry, or simply radar) are described. Conventional radar chips may operate within a temperature range (e.g., 0° C. to 35° C. ambient temperature) in which carrying out radar detection functionality (e.g., motion detection, respiration detection, etc.) meets desired performance criteria such as performance accuracy, performance efficiency, operational cost, chip hardware restrictions, regulatory guidelines, among others. For example, the Federal Communications Commission (FCC) mandates limits on wireless communications, such as, a +10 dBm effective isotropic radiate power (EIRP) limit in radar communications. Often conventional radar chips may be subject to a power drop (e.g., 0.25 dB/° C. when operating at 60 GHz). Changes in power, such as the aforementioned power drop, may affect the signal strength of the radar chip. For example, in some conventional radar chips, a change in 5° C. of the internal operating temperature of the radar chip may result in a loss upwards of 1 dB in signal strength. The drop in power may result in the radar chip failing to perform intended functionality by having a signal strength that is too low (e.g., outside an operational range) and may cause the radar chip to compensate for the low power by selecting a gain state that results in the signal strength violating regulatory guidelines.

Conventional radar chips often do not include automatic gain control (AGC) typically employed by other wireless communication chipsets (e.g., to efficiently remedy power drops) and are subject to power drop. Additionally, conventional radar chips using alternative gain control techniques often require operation of the radar chip to halt while the radar chip performs alternative gain control methodology. The halting of radar operations may take the radar chip offline, preventing performance of desired/intended functionally. For example, a radar chip may be a part of a monitoring device that may be incapable of performing consistent monitoring during a gain control calibration procedure. In another example, conventional systems may not actively transmit and measure signals during an automatic gain control (AGC) procedure. This means the device may be incapable of sensing its environment during the duration of the calibration. In some scenarios, if the AGC is triggered repeatedly in a short amount of time, the system may lose, in aggregate, a large amount of a radar data. Repeated triggering of the AGC can happen if the device temperature changes quickly after a gain state is selected. For example, temperature changes may alter an operation of a radar chip sufficient enough to warrant reconfiguring the radar chip to use an updated gain state. Rapid temperature changes may trigger the radar chip to frequently perform gain state calibration taking the radar chip offline for extended periods of time. A common occurrence of rapid temperature changes corresponds to the radar chip's initializing stage from a reduced-power or off state.

Upon initialization, radar chips can use a heat-up procedure to put an internal operating temperature of the radar chip within the dynamic operable range. For example, to minimize the required gain steps, radar transmission may be restricted or otherwise reduced when the radar chip internal operating temperature is below a minimum threshold temperature (e.g., 30° C.) and employ a heat-up mode to raise the internal operating temperature into the operational range. Depending on product requirement, a radar may need to be operational within a threshold time duration (e.g., 1 min), which may demand the junction temperature of the radar chip to be within the operational range within the threshold time duration. Hence, to properly perform desired radar functionality, a radar chip may need to reach a minimum operational temperature within the threshold time limit consistently to effectively carry out radar transmission/detection for a given function or operation, such as to carry out a desired monitoring schedule or perform measurements on a cadence. Conventional systems leverage minimum heating times to predict when a radar chip will enter a thermal steady-state condition (e.g., steady-state internal operating temperature). For example, a steady-state operating temperature may include a temperature value or a range of temperature value of an internal temperature of the radar unit operating after a period a time the results in the internal operating temperature maintaining a temperature within a temperature window (e.g., deviation of the temperature is limited). However, leveraging a minimum heating time without tracking internal operating temperature can result in overshooting and undershooting the steady-state temperature of the radar chip. As will be discussed herein, overshooting and undershooting the steady-state temperature can be costly on radar performance. After exiting a heating mode, if the temperature of a radar chip continues to change at any material rate, the radar chip is likely to be taken offline to recalibrate the gain state again, and again until the radar chip attains a steady-state condition. The increased recalibration of the radar chip may hinder performance and demand increased processing overhead, bandwidth, and energy consumption to repeatedly recalibrate the temperature control gain until the junction temperature of the radar chip settles into the steady-state condition.

Aspects of the present disclosure address the above and other deficiencies by providing methods, devices, and systems for junction temperature measurement and temperature gain control on a radar unit (e.g., mm Wave radar transmitter and sensors). A new process is developed to reduce the start-up time on a radar chip that does not utilize power feedback loops to perform gain control to enable low power modes and regulatory compliance. For example, reduced start-up times on a radar chip may allow the radar to be sustained in a low-power state (e.g., off-state) for a longer percentage of time for a given operational procedure or measurement cadence. The present disclosure leverages a target junction temperature that can be used as a set point in lieu of a fixed time heat-up mode employed by conventional systems. Aspects of the present disclosure include the use of a temperature offset representative of an inherent bias of the radar unit. (e.g., measurement bias across multiple radar chips from an expected measurement) of radar chips that mitigate the effects of temperature sensing limitations of conventional radar chips. Ambient temperature sensing (ATS) may be employed to regularly determine the ambient temperature of radar chips such as, for example, to calculate and account for the effects of ambient temperature on heat-up mode procedures and radar chip junction temperature calculations (e.g., changing a target radar chip junction temperature when in a steady-state due to ambient temperature).

Aspects of the present disclosure may include calibrating radar chips by determining an offset representative of an inherent bias (e.g., how much does an individual radar chip temperature measurement differ from an expected temperature measurement value) associated with the radar chip's temperature sensing unit and storing, in local memory of the radar chip, the offset, and using the offset to compensate for the inherent bias. A radar chip may perform a heat-up procedure that leverages regular junction temperature measurements. The junction temperature measurements may be used to determine whether an end condition of the radar chip heat-up mode is satisfied. Accuracy of the temperature measurements helps ensure a radar chip has been heated to a target temperature (e.g., a minimum operating temperature of a dynamic operational range). Stored offset values (sometimes referred to as correction factors) may quickly be retrieved and applied to temperature sensing measurements to improve the accuracy of the temperature measurements. Aspects of the present disclosure with this updated junction temperature may further be used to estimate the corresponding gain control with increased precision over conventional systems.

Radar, also referred to as radio detection and ranging, is a detection system that uses radio waves to determine a distance (ranging), an angle, and/or a velocity of one or more objects. A radar unit includes a transmitter that produces electromagnetic waves in the radio or microwave domain and one or more receivers to measure electromagnetic waves reflected off an object. A radar unit can also be referred to as a radar sensor or a radar device. Although sometimes referred to as a radar sensor, it should be noted that a radar sensor has both a transmitter and one or more receivers to transmit a radar signal (radio waves) and receive or measure the reflected signals (reflected waves) from the radar signal encountering an object. The radio waves (pulsed or continuous) from the transmitter and reflected off the object given information about the object's location and speed. Aspects of the present disclosure can also be used with other sensing systems, such as an ultrasound unit. A sensing system can include at least one transmitter to transmit sound or electromagnetic waves and at least one receiver to measure reflected waves to determine a distance value between the sensing system and an object and an angle value between the sensing system and the object. Radar, as used herein, may be leveraged to measure human vital signs such as heart rate and respiratory rate such as to track sleeping patterns to determine the quality of sleep metrics.

In at least one embodiment, an electronic device includes a radar unit that operates in a millimeter-wave (mmWave) frequency range. The electronic device may further include a first temperature sensing unit coupled to the radar unit and configured to determine an internal operating temperature of the radar unit. The electronic device may include a processing device coupled to the radar unit. The electronic device may include a second temperature sensing unit coupled to the processing device and configured to determine an ambient temperature of the electronic device (e.g., of a region monitored by the electronic device). In some embodiments, the ambient temperature includes a temperature of a region monitored by the radar unit. The electronic device may further include a memory coupled to the processing device to store a table relating ambient temperatures of the electronic device to steady-state internal operating temperatures of the radar unit. The memory may further store computer-executable instruction that, if executed, cause the electronic device to perform operations. The operations may include receiving, by the processing device from the second temperature sensing unit, a first value indicating the ambient temperature of the electronic device. The operations may further include determining, by the processing device using the first value and the table, a second value indicating the internal operating temperature corresponding to a steady-state of the radar unit. The operations may further include receiving, by the processing device from the first temperature sensing unit, a third value indicating the internal operating temperature of the radar unit while operating in the first mode. The operation may further include determining, by the processing device, a fourth value indicating a temperature correction corresponding to the radar unit. The operations may further include determining, by the processing device, a fifth value in view of the fourth value and the third value. The fifth value indicates a corrected internal operating temperature of the radar unit. The operations may further include determining, by the processing device, that the fifth value is greater than or equal to the second value. The operations may further include causing the radar unit to terminate operating in the first mode responsive to determining that the fourth value is greater than or equal to the second value.

In at least one embodiment, a method includes determining a first value of an internal operating temperature corresponding to a steady-state of a radar unit (e.g., a steady-state internal operating temperature) configured to transmit radar signals and acquire radar data. The method further includes causing the radar unit to operate in a first mode associated with heating the radar unit. The method further includes obtaining a second value of the internal operating temperature at a first time in the first mode. The method further includes determining a third value indicating an offset representative of a measurement bias of the radar unit. The method further includes determining a fourth value in view of the second value and the third value. The fourth value indicates an updated internal operating temperature (e.g., a bias compensate temperature measurement value). The method further includes determining that the fourth value satisfies a temperature criterion corresponding to the first value. The method further includes causing the radar unit to stop (e.g., cease) operating in the first mode responsive to the second value satisfying the temperature criterion.

In at least one embodiment, a monitoring device includes a radar unit that operates in a millimeter-wave (mmWave) frequency range. The monitoring device may include a processing device coupled to the radar unit. The processing device may further include a memory coupled to the processing device to store computer-executable instructions that, if executed, cause the monitoring device to perform operations. The operations may cause the radar unit to operate in a first mode corresponding to heating the radar unit. The operation may further cause the radar unit to conclude operating in the first mode and perform a calibration procedure corresponding to gain control responsive to determining a first value indicating a first temperature associated with the radar unit meets a temperature threshold criterion. The operations may further include determining a gain state (e.g., a signal amplification value) of the radar unit based on the calibration procedure. The operations may further include causing the radar unit to operate in a second mode corresponding to transmitting radar signals and acquiring radar data using the gain state. The radar data may be associated with monitoring an environment of the monitoring device. For example, the monitored environment may include a sleeping environment.

FIG. 1 depicts a temperature gain control system 100 including a monitoring device 103 with a radar unit 102, according to at least one embodiment of the present disclosure. The monitoring device 103 may include a communication module 190 (e.g., a Wi-Fi communication chip), temperature sensing hardware 195, a processor 162, a radar unit 102, and a memory 140. The monitoring device 103 may be configured to monitor a monitored area 101 (e.g., a sleeping environment such as an environment including a bed). The processor 162 may include, and may also be referred to as, a controller or a microcontroller. The processor 162 may include multiple processors in some embodiments.

The monitoring device 103 may include a radar unit 102 that includes one or more transmission (Tx) chains and receiving (Rx) chains 107 to transmit and/or receive signals corresponding to respiratory-related motion occurring within a monitored area 101. The Tx/Rx chains 107 may include one or more millimeter-wave (MM wave) radar sensors to acquire radar data, such as detecting a respiration waveform of a person located within the monitored area 101. The radar unit 102 may further include a gain control unit 109. In an embodiment, the gain control unit 109 may include a fixed number of gain states. A gain state may include a representation of a gain value or, more generally, the gain of a transmitted radar signal. The gain of a radar antenna is a measure of the concentrated energy in the beam relative to the energy which would impinge upon a target if the same transmitted energy was emitted by an isotropic antenna. Each gain state adjusts a signal power associated with transmitting and/or receiving a radar signal. As mentioned previously, internal operating temperature associated with the radar unit can affect an overall signal strength associated with transmitting and/or receiving signals of the radar unit 102. As is discussed further in other embodiments, the gain state may be selected and updated according to a signal strength of the radar unit (e.g., dependent on the internal operating temperature).

According to an embodiment, the radar unit 102 includes one or more sensors (e.g., inertial measurement unit (IMU) sensors, magnetometer sensors, radar sensors, motion detectors, etc.) to collect and process data corresponding to monitored area 101, such as to monitor the respiratory activity of a user. For example, the radar unit 102 may be configured to detect motion of a user. Motion data may be leveraged to initiate one or more procedures associated with temperature prediction engine 163, heat-up engine 164, gain control engine 165, and/or radar operation engine 166, as will be discussed further.

As shown in FIG. 1, the monitoring device 103 includes temperature sensing hardware 195. The temperature sensing hardware 195 may include one or more of thermistors, digital temperature sensors, and/or other temperature sensing devices capable of acquiring sensor data associated with temperature. Thermistors are a type of resistor whose resistance is strongly dependent on temperature. Negative temperature coefficient (NTC) thermistors' resistance decreases with temperature, while positive temperature coefficient (PTC) thermistors' resistances increase with temperature. To obtain temperature, NTCs may be connected in parallel with a resistor to create a voltage divider circuit. When the temperature changes, the resistance across this circuit changes resulting in change in the voltage drop across the thermistor. An analog to digital converted (ADC) measures this voltage drop and since the thermistor is connected with a known fixed resistance the resistance change of the thermistor can be calculated. The tolerance of these resistors chosen or the accuracy of the ADC measurements can affect the accuracy of the reading. Digital temperature sensor may be more accurate in comparison to NTC/PTC sensors but can be more costly in one or more of size, energy, and commercial cost. The temperature sensing hardware may include a combination of temperature sensing devices. The radar unit may include one or more integrated circuits for performing one or more of the functions described herein. The radar unit may include a current sensor for measuring a magnitude of current along one or circuits of the radar unit.

In an embodiment, the temperature sensing hardware 195 can measure ambient temperature. Ambient temperature, according to some embodiments, represents a temperature of the surrounding air or environment in which the monitoring device resides (e.g., while the device is on). Ambient temperature may include the temperature of one or more elements of the monitoring device 103 as well as the surrounding environment. In some embodiments, the ambient temperature encompasses a portion of the monitored region 101

In an embodiment, temperature sensing hardware 195 can measure an internal operating temperature. In some embodiments, the internal operating temperature is associated with an operating temperature of one or more elements of the monitoring device (most commonly the radar unit or components of the radar). The internal operating temperature, which can also be indicated as the transistor junction temperature, includes the maximum operating temperature of a semiconductor in use in an electronic device (e.g., monitoring device 103). Internal operating temperature may include a temperature of one or more semiconductor junctions of a radar unit. The internal operating temperature may also be referred to an internal operating temperature or a temperature within the radar unit.

As shown in FIG. 1, the monitoring device 103 includes a processor 162. The processor 162 can execute the instructions stored in memory 140 to perform the operations described herein. The instructions can be computer-executable instructions that, if executed, cause the processor 162 (or monitoring device 103) to perform operations as described herein. As shown in FIG. 1, the processor includes a temperature prediction engine 163, a heat-up engine 164, a gain control engine 165, and a radar operation engine 166. The various engine may be leveraged and coordinated by the processor 162 to carry out the methodology described herein. Though the processor 162 is described as having multiple processing engines, the division of functionality of the processor between each of the processing engines is purely exemplary, The temperature prediction engine 163 coordinates the measurement of temperatures associated with the monitoring device and/or the radar unit 102. The temperature prediction engine 163 may use temperature sensing hardware 195 to measure the temperature of one or more of an ambient environment of the monitoring device 103, a temperature associated with the monitored area 101, and/or an internal operating temperature corresponding to the radar unit 102. Internal operating temperature, sometimes referred to as transistor internal operating temperature, can include an operating temperature of one or more semiconductors associated with the radar unit 102. In some embodiments, the temperature prediction engine 163 leverages models (e.g., statistical model, machine-learning models, deterministic models, etc.) stored locally or accessed through a network 110, 112 (e.g., a cloud service) to predict a temperature from measured sensor data (e.g., electrodynamic measurement such as current, resistance, power, etc.). Details of the temperature prediction engine 163 and the temperature sensing hardware 195 are discussed further in FIG. 6.

The heat-up engine 164 leverages operations of the radar unit to increase an internal operating temperature associated with the radar unit. The heat-up engine 164 employs a target internal operating temperature associated with a steady-state of the radar unit. The heat-up engine 164 directs the radar unit 102 to perform high-power operations to increase the internal operating temperature of the radar unit 102. The heat-up engine 164 concludes after determining the internal operating temperature meets the previously determined target threshold temperature (e.g., the stead-state internal operating temperature). The heat-up engine 164 may be triggered upon initialization of the monitoring device 103, detection of motion (e.g., a presence detection) by the monitoring device 103, a scheduled cadence (e.g., a monitoring schedule). Details of the heat-up engine 164 are discussed further in FIGS. 2A-B.

The gain control engine 165 directs the radar unit 102 to perform gain control calibration. Gain control calibration may include sweeping the gain control unit 109 through various gain states and mapping a resulting signal power level associated with using each gain state. A gain state may be determined based on determining signal power levels corresponding to each gain state. In an embodiment, the gain state is determined by turning on the internal transmitter embedded in the Rx chain (separate from Tx chain, not connected to any antenna) and measuring the power using the Rx chain itself. The feedback power is then converted to Effective Isotropic Radiated Power (EIRP) (e.g., based on calibration for each radar chip during production). Details of the gain control engine 165 are discussed further in FIG. 3.

The radar operation engine 166 configured the radar unit to transmit and acquire radar data. For example, the radar operation engine 166 may leverage Tx/Rx chains to acquire radar data, such as detecting a respiration waveform of a person located within the monitored area 101. Details of the radar operation engine 166 are discussed further in FIG. 3.

In an embodiment, the respiration waveform can be detected according to a suitable waveform extraction algorithm (e.g., a Doppler radar for noncontact vitals monitoring methodology). For example, the waveform extraction algorithm can include a multistage processing of radar outputs raw In-phase and Quadrature (I/Q) data of received echo signals. In an embodiment, the one or more radar sensors are used to "bin" the receive signals such that the receive signals are stored into a set of bins by the time of arrival relative to a transmit pulse. In an embodiment, the radar operation engine 166 checks the receive signal strength in the respective bins to enable the sorting of the returns across the different bins, which correspond to different ranges.

In an embodiment, a range fast Fourier Transform (FFT) is implemented over these samples (a fast-time domain) to identify a channel response for each distance bin. In this example, another FFT is implemented over the frames within the respiration window (slow-time domain) for a set of candidate bins to determine which bin contains the respiration signal. In an embodiment, the bin corresponding to the desired respiration signal is selected based on a metric for a periodicity and a phase of that bin along the time domain to identify a selected or target waveform to be extracted.

In an embodiment, the one or more sensors of the radar unit measure a displacement of a user's chest to identify a respiratory rate associated with the user. In an embodiment, radar operation engine 166 uses three-dimensional imaging to generate a set of energy voxels corresponding to chest displacement movements and periodicity corresponding to a breathing pattern of the user. In an embodiment, the set of energy voxels is processed by the respiratory activity tracker to generate the respiration or breathing waveform corresponding to the user during a given sleep session.

In an embodiment, the processor 162 can generate a respiration waveform representing a respiratory rate or number of breaths a user takes per minute. In an embodiment, the respiratory rate data and associated waveform can be further processed to generate one or more analytics indicative of a quality of sleep of the primary user. For example, the respiration waveform can be analyzed to generate a sleep score (e.g., an indication or score indicative of a quality of sleep). In an embodiment, a sleep score can be determined in accordance with a suitable sleep score generation methodology as a function of one or more factors, including an overall sleep time, a duration of the REM sleep stage, a duration of a light sleep stage, a duration of a deep sleep stage, etc. In an embodiment, the sleep stages can be estimated using a deep neural network that takes the respiration waveform as the input.

In an embodiment, one or more radar sensors of the monitoring device 103 perform a localization of reflected signal in the 3D geometry, which is further subdivided into voxels. A voxel is a discrete volume element of graphic information in a three-dimensional (3D) space. The voxel can be used in the radar domain to represent the smallest volume element governed by a combination of range and angular resolution (e.g., also referred to as a range bin, angular bin individually in a 2D space). Each voxel carries information derived from a phase and amplitude of a reflected signal from corresponding geometric volume in the real world.

In an example mode of operation, the monitoring device 103 communicates with a wireless network 110 of a user. Although the wireless network 110 is referred to herein as "wireless," in some embodiments may not be wireless, such as where the monitoring device 103 is connected to the user's network via an Ethernet connection, for example. The wireless network 110 is connected to another network 112. The networks 110 and 112 may be the same network in some of the present embodiments. The networks 110 and 112, may include but are not limited to the Internet, a Wi-Fi network compatible with the IEEE 802.11 standard and/or other wireless communication standard(s) including but not limited to WAP (Wireless Application Protocol), GPRS (General Packet Radio Service), GSM (Global System for Mobile Communication), LTE, VOLTE, LoRaWAN, LPWAN, RPMA, LTE Cat-"X" (e.g., LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), Z-Wave, RIM (Research in Motion, Limited) duplex paging network, Bluetooth radio, an IEEE 802.11-based radio frequency network, or a combination thereof.

As described below, the monitoring device 103 may communicate with a client device 114 of the user via the wireless network 110 and/or the network 112. The client device 114 may include, for example, a computer, a laptop, a tablet, a mobile telephone (may also be referred to as a cellular telephone), such as a smartphone, a personal digital assistant (PDA), or another communication device capable of receiving and/or transmitting data across one or both of the networks 110, 112. The client device 114 may include a display and related components capable of displaying data associated with the monitoring device 103. The client device 114 may also include a speaker and related components capable of providing alerts to the user or another person responsible for the user, and may also include a microphone. In some embodiments, one or more of the network 112, server 118, storage 116, API 120, and client device 114 are associated with a cloud service. For example, one or more functions of the monitoring device may be performed by the cloud service using one or more of network 112, server 118, storage 116, API 120, and client device 114.

The monitoring device 103 may also communicate with one or more remote storage device(s) 116, one or more servers 118, and/or an application programming interface (API) 120 via the wireless network 110 and the network 112 (Internet/PSTN). While FIG. 1 illustrates the remote storage device 116, the server 118, and the API 120 as components separate from the network 112, it is to be understood that the remote storage device 116, the server 118, and/or the API 120 may be considered to be components of the network 112.

In response to the detection of certain conditions by the monitoring device 103, the monitoring device 103 sends an alert to the client device 114 via the wireless network 110 and/or the network 112. The monitoring device 103 may also send motion data and/or respiration data (e.g., respiration waveforms) to the client device 114 of the user (e.g., via the network 112 and/or the server 118).

The motion data (e.g., radar data), respiration rate data, and/or sleep quality data captured by the radar unit 102 may be uploaded and recorded on the remote storage device 116. In some of the present embodiments, the motion data, respiration rate data, and/or sleep quality data may be recorded on the remote storage device 116 even if the user (or administrator) chooses to ignore the alert sent to the user's client device 114. In such embodiments, the user (or administrator) may access the motion data (e.g., radar data), respiration rate data, and/or sleep quality at a later time by accessing the remote storage device 116 using the user's client device 114.

The API 120 may include, for example, a server (e.g., a bare-metal server, or a virtual machine, or a machine running in a backend infrastructure as a service), or multiple servers networked together, exposing at least one API to the client(s) accessing it. These servers may include components such as application servers (e.g., software servers), depending upon what other components are included, such as a caching layer, or database layers, or other components. The API 120 may, for example, include many such applications, each of which communicates with one another using their public APIs. In some embodiments, the API 120 may hold the bulk of the user data and offer the user management capabilities, leaving the clients with a very limited state.

The API 120 is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate the integration of new features into existing applications (a so-called "plug-in API"). An API can also assist otherwise distinct applications with sharing data, which can help to integrate and enhance the functionalities of the applications.

In various embodiments, the API 120 includes one or more services (also referred to as network services). A network service is an application that provides data storage, manipulation, presentation, communication, and/or other capabilities. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface and sometimes other associated hardware.

The memory 140 may be transitory and/or non-transitory and may represent one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of the memory 140 may be integrated with the processor 162. The memory 140 can store monitoring data 141 (e.g., motion data (e.g., radar data), respiration rate data, and/or sleep quality) measured in the monitored area 101 and bias data 143 according to temperature measurements corrections of the temperature sensing hardware 195. The memory 140 can store instructions corresponding to a temperature prediction engine 163, a heat-up engine 164, a gain control engine, and a radar operation engine 166. Bias data 143 indicates an offset value representative of a measurement bias of the radar unit 102. Details of the bias data 143 (e.g., determination, generation) are further discussed in FIG. 5.

FIG. 2A depicts a flow diagram of a process 200 for a heating a radar chip (or more generally a radar unit) using a target temperature threshold, according to at least one embodiment of the present disclosure. Process 200A may be performed, at least in part, by processing logic that may include hardware (e.g., circuitry, dedicated logic, programmable logic, microcode, processing device, etc.), software (such as instructions run on a processing device, a general-purpose computer system, or a dedicated machine), firmware, microcode, or a combination thereof. Process 200 may be implemented by one or more of a radar unit and a host device (e.g., processor 162, client device 114), or more generally, a host. Process 200 includes a heat-up mode where the radar chip actively increases a corresponding internal operating temperature. In some embodiments, the heat-up mode is initialized when a radar chip is turned on (e.g., on a fixed schedule, receiving an external alert, etc.).

At block 202, processing logic initiates the radar. At block 204, a host configures the heat-up mode 220 to start with the temperature threshold, $T_{min}$. Processing logic determines that an internal operating temperature of the radar chip is below the temperature threshold. Responsive to determining that the internal operating temperature of the radar chip is below the temperature threshold, process 200 continues to block 206.

The temperature threshold is associated with an internal operating temperature of the radar chip when the radar chip is in a steady-state. Steady-state generally indicates an unvarying condition in a physical process. The steady-state of a radar chip, as used herein, is a condition of the radar chip to maintain a generally consistent temperature (e.g., within 1%, 5%, 10%) while in an operative state. Details regarding steady-state are further discussed in FIG. 4.

The temperature threshold may be determined using relationship data. The relationship data indicates a relationship between steady-state internal operating temperature (e.g., internal operating temperature of a semiconductor of the radar unit) of the radar unit and corresponding ambient temperatures of a monitored area (e.g., monitored area 101 of FIG. 1). In some embodiments, the relationship data is stored locally (e.g., in memory 140 of FIG. 1), and in some embodiments, the relationship data is stored externally (e.g., storage 116 of FIG. 1) and accessed through a communication medium (e.g., network 110, 112 of FIG. 1).

In some embodiments, the relationship data associates ambient temperature of a region monitored by the radar unit to expected internal operating temperature of the radar unit using a conversion formula such as, for example, one or more mathematical operations. The conversion formula may include one or more mathematical operations (e.g., a regression formula) to convert an ambient temperature of the region monitored by the radar unit to an internal operating temperature of the radar unit. In some embodiments, the relationship data may be stored in a data structure having key value pairs. The key of each key value pair may include an ambient temperature of a region monitored by the radar unit and the value of each kay value pair may include a corresponding internal operating temperature of the radar unit corresponding to the steady-state condition. For example, the data structure may include a relationship table (e.g., a look-up table) that stores values (e.g., temperature values) that can be accessed by the host device to configure the radar chip. The below Table 1 illustrates an example table associating ambient temperature of the region monitored by the radar unit and an internal operating temperature.

TABLE 1

| Ambient Temperature | Expected Internal Operating Temperature |
| --- | --- |
| $T_{A1}$ | $T_{J1}$ |
| $T_{A2}$ | $T_{J2}$ |
| $T_{A3}$ | $T_{J3}$ |
| $T_{An}$ | $T_{Jn}$ |

Where $T_{An}$ represents individual ($n^{th}$ row or data point) ambient temperature measurements by the radar unit and $T_{Jn}$ represents corresponding expected internal operating temperature (e.g., junction temperature) of the radar unit ($n^{th}$ row or data point).

Processing logic may determine an ambient temperature corresponding to the radar chip (e.g., of a region monitored by the radar chip). Processing logic may use the ambient temperature with the relationship table to determine a steady-state internal operating temperature associated with the determined ambient temperature. In some embodiments, the relationship data is stored as a model (e.g., a mechanistic, statistical, or machine-learning model). For example, any linear regression, nonlinear regression, exponential regression, least square regression, and/or any combination thereof can be used with historical data (e.g., historical ambient temperature and historical steady-state internal operating temperature, temperature of corresponding monitored regions of a selection of radar units) to generate a relationship model. In another example, statistical modeling can analyze historical data to determine a correlation between ambient temperature and the steady-state internal operating temperature. Processing logic may determine (e.g., predict) an ambient temperature of the radar chip. For example, the host device may direct temperature sensing hardware (e.g., temperature sensing hardware 195 of FIG. 1) to acquire sensor data indicating a state of an ambient environment of the radar unit. Processing logic may determine the ambient temperature using the sensor data. For example, processing logic may determine the ambient temperature using a linear model. Details associated with ambient temperature prediction are further discussed in FIG. 6.

At block 206, processing logic initiates the heat-up mode on the radar chip. The heat-up mode may include operating the radar chip to raise the internal operating temperature of the radar chip. For example, at block 208, the radar chip operates in a high-power state. In the high-power state, the processing logic activates the Rx chains to draw an increased quantity of power beyond normal radar operations. The high-power state may heat the radar chip at a faster rate than normal operations of the radar. In some embodiments, the Tx chains are not active as the host device has limited control of the signal strength while the temperature of the radar chip is rapidly changing. However, the Rx chains may be employed to draw power and increase the internal operating temperature of the radar chip.

At block 210, processing logic causes measurement of the internal operating temperature of the radar chip. Processing logic determines whether a current internal operating temperature of the radar meets the threshold temperature previously identified in block 204. For example, processing logic determines whether the radar chip is in a near steady-state condition. Responsive to determining that the radar internal operating temperature is greater than or equal to the threshold temperature, processing logic proceeds along the yes path to block 212. Responsive to determining that the radar internal operating temperature is less than (e.g., is not greater than or equal to) the threshold temperature, processing logic proceeds along the no path to block 208. The radar internal operating temperature is measured throughout the heating process and compared against the threshold until the threshold temperature is met.

In some embodiments, processing logic applies an offset (sometimes referred to as a temperature correction value) to the measurement of the internal operating temperature of the radar unit. The offset may representative of an inherent bias of internal operating temperature measurements, such as the inherent bias of temperature sensing hardware measuring an internal operating temperature of the radar unit. The temperature correction value is applied to the measured internal operating temperature, and the corrected/updated internal operating value is used in comparison with the threshold temperature associated with the radar unit operating in a thermal steady-state.

At block 212, processing logic stops the heating mode. The host may send instructions to the radar unit to stop or halt operations, effectively stopping the heat-up mode of the radar unit. At block 214, operation of the radar chip proceeds with the gain control calibration and/or operational functionality (e.g., area monitoring).

FIG. 2B depicts a flow diagram of a process for a heat-up mode of a radar unit using a time duration threshold, according to at least one embodiment of the present disclosure. Process 250 may be performed, at least in part, by processing logic that may include hardware (e.g., circuitry, dedicated logic, programmable logic, microcode, processing device, etc.), software (such as instructions run on a processing device, a general-purpose computer system, or a dedicated machine), firmware, microcode, or a combination thereof. Process 250 may be implemented by one or more of a radar unit and a host device (e.g., processor 162, client device 114), or more generally, a host. Process 250 may be implemented by one or more of a radar unit and a host device (e.g., processor 162, client device 114), or more generally, a host. Process 250 includes a heat-up mode 280 where the radar chip actively increases a corresponding internal operating temperature for a target time duration.

At block 252, the radar is initialized. At block 254, a host configures the heat-up mode 280 to start with a threshold time duration, $T_{heatup}$ (e.g., a timeout). The threshold time duration may be based on a steady-state time duration. The threshold time duration may be based on a time duration prediction associated with the radar reaching the steady-state.

At block 256, the heat-up mode 280 starts on the radar chip. At block 258, heating techniques such as those discussed in association with block 206 and block 208 are implemented to heat the radar.

At block 260, processing logic determines an elapsed time associated with operating in the heat-up mode 280 and determines whether the elapsed time is greater than the threshold time duration. Responsive to determining that the elapsed is not greater than or not equal to (e.g., less than) the threshold time duration, processing logic proceeds along the no path to block 258. Responsive to determining that the elapsed time is greater than or equal to the threshold time durations, processing logic proceeds to block 262.

At block 262, processing logic stops the heat-up mode 280. The host may send instructions to the radar unit to stop or halt operations, effectively stopping the heat-up mode 280 of the radar unit. At block 282, operation of the radar chip proceeds with the gain control calibration and/or operational functionality (e.g., area monitoring).

Figure 3:
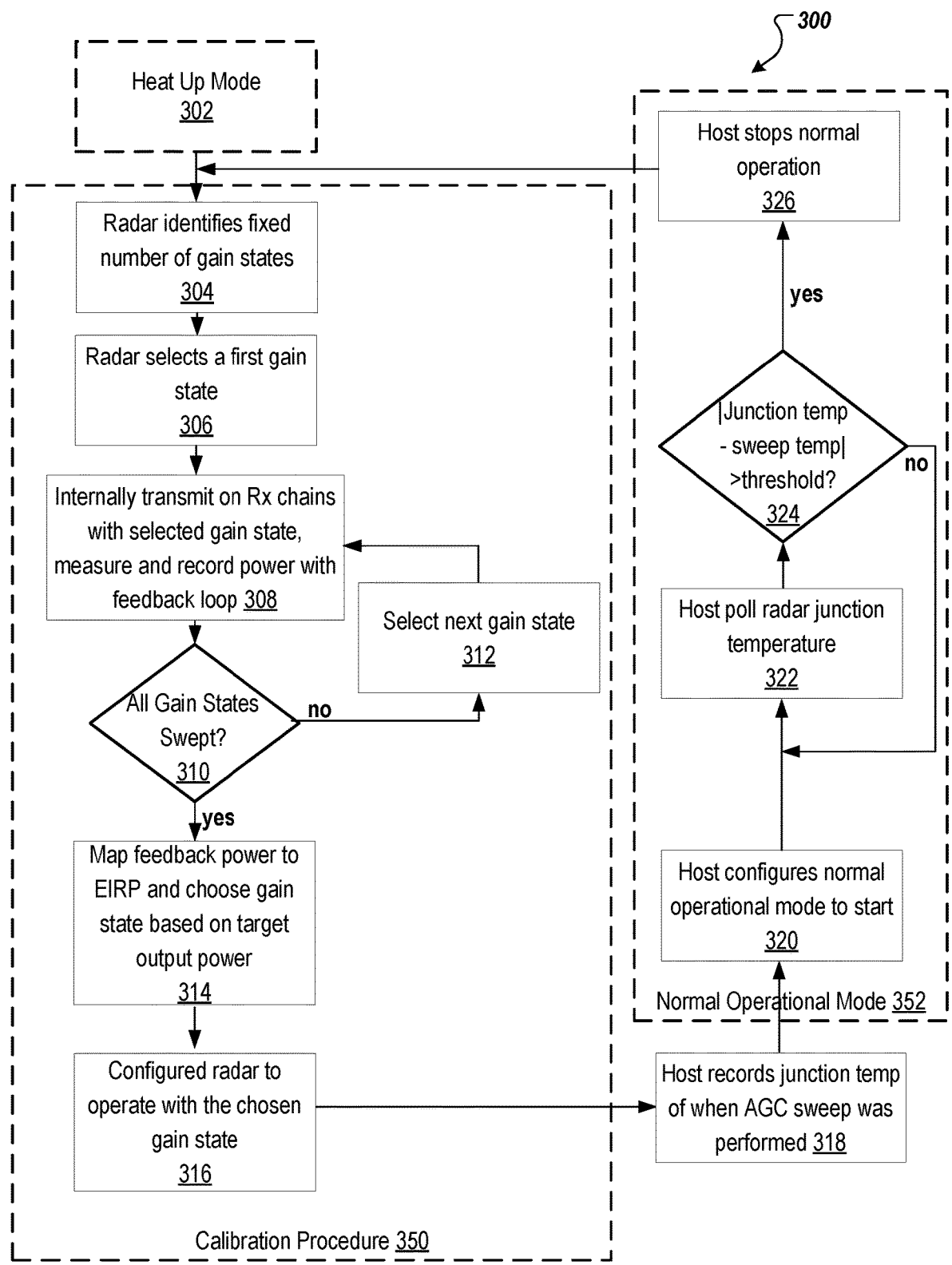
FIG. 3 depicts a flow diagram of a process for temperature gain control, according to at least one embodiment of the present disclosure.

FIG. 3 depicts a flow diagram of a process 300 for temperature gain control, according to at least one embodiment of the present disclosure. Process 300 may be performed, at least in part, by processing logic that may include hardware (e.g., circuitry, dedicated logic, programmable logic, microcode, processing device, etc.), software (such as instructions run on a processing device, a general-purpose computer system, or a dedicated machine), firmware, microcode, or a combination thereof. Process 300 may be implemented by one or more of a radar unit and a host device (e.g., processor 162, client device 114).

At block 302, processing logic carries out a heat-up mode associated with the radar. Block 302 may include details, features, and/or methodologies discussed in association with process 200 and/or 250 of FIGS. 2A-B.

As shown in FIG. 3, process 300 includes a selection of boxes associated with a calibration procedure 350. The calibration procedure is associated with selecting a gain state configuration for the radar to use during a normal operational mode 352 (e.g., transmitting radar signals and acquiring radar data, monitoring an area, collecting motion data, etc.). The normal operation mode 352 includes carrying out a selection of process 300.

At block 304, processing logic identifies a fixed number of gain states associated with the radar. In an embodiment, the radar includes a gain control unit with a fixed number of gain states. A gain state is a representation of a gain value or, more generally, the gain of a transmitted/received radar signal. The gain of a radar antenna is a measure of the concentrated energy in the beam relative to the energy which would impinge upon a target if the same transmitted energy was emitted by an isotropic antenna. Each gain state adjusts a signal power associated with transmitting and/or receiving radar signals. As mentioned previously, internal operating temperature associated with the radar unit can affect an overall signal strength associated with transmitting and/or receiving the radar signal.

At block 306, the radar chip selects a first gain state. The first gain state may be associated with minimum gain or the smallest of the gain states. At block 308, processing logic performs a radar test function such as an internal radar transmission associated with the Rx chains using the selected gain state. Processing logic measures and records an associated power (e.g., using feedback logic such as a feedback loop).

At block 310, processing logic determines whether all the gain states have been swept. Responsive to determining that all gain states have not been swept, processing logic proceeds along the no path to block 312 where a new gain state is selected, and processing logic proceeds back to block 308. Responsive to determining that all gain states have been swept, processing logic proceeds along the yes path to block 314. In an embodiment, a sweep includes iteratively using different gain states to determine corresponding output power.

At block 314, processing logic maps feedback power to EIRP and chooses a gain state based on target output power. Effective radiated power (ERP), synonymous with equivalent radiated power, is an IEEE standardized definition of directional radio frequency (RF) power, such as that emitted by a radio transmitter. It is the total power in watts that would have to be radiated by a half-wave dipole antenna to give the same radiation intensity (signal strength or power flux density in watts per square meter) as the actual source antenna at a distant receiver located in the direction of the antenna's strongest beam (main lobe). ERP measures the combination of the power emitted by the transmitter and the ability of the antenna to direct that power in a given direction. It is equal to the input power to the antenna multiplied by the gain of the antenna. It is used in electronics and telecommunications, particularly in broadcasting, to quantify the apparent power of a broadcasting station experienced by listeners in its reception area. The effective isotropic radiated power is the hypothetical power that would have to be radiated by an isotropic antenna to give the same ("equivalent") signal strength as the actual source antenna in the direction of the antenna's strongest beam. The difference between EIRP and ERP is that ERP compares the actual antenna to a half-wave dipole antenna, while EIRP compares it to a theoretical isotropic antenna.

At block 316, processing logic configures the radar to operate with the chosen gain state. A gain state may be chosen based on desired performance criteria such as sensor accuracy, efficiency, operational cost, chip hardware restrictions, regulatory restrictions, among other conditions. For example, the Federal Communications Commission (FCC) lays out guidelines that place limits on wireless communications, such as, for example, a +10 dBm EIRP limit to radar communications.

At block 318, processing logic records internal operating temperature associated with the calibration procedure 350. For example, the recorded internal operating temperature is associated with performing the automatic gain control (AGC) sweep (e.g., testing the various gain state to determine corresponding output power). In some embodiments, processing logic applies an offset representative of a measurement bias of the radar unit to the recorded internal operating temperature associated with the radar. Details associated with internal operating temperature are further discussed in FIG. 5. In some embodiments, a received temperature value indicates completion of the calibration procedure.

At block 320, processing logic configures normal operational mode to start. The normal operational mode may include transmitting and acquiring radar data, capturing respiration data, tracking sleep patterns, etc.

At block 322, processing logic polls radar internal operating temperatures while in the normal operational mode 352. In some embodiments, processing logic applies an offset representative of a measurement bias of the radar unit. Details associated with internal operating temperature are further discussed in FIG. 5. At block 324, processing logic determines whether a magnitude of a difference between the internal operating temperature associated with the calibration procedure 350 and the polled radar internal operating temperature while in the normal operational mode 352. Responsive to determining the magnitude of the difference is greater than a threshold temperature, processing logic proceeds along the yes path to block 326. Responsive to determining the magnitude of the difference is not greater than the threshold value, processing logic proceeds along the no path, and the normal operational mode 352 continues.

At block 326, processing logic stops the normal operational mode 352. Processing logic returns to the block 304 and performs the calibration procedures with the radar unit having the updated internal operating temperature measured in block 322.

Figure 4B:
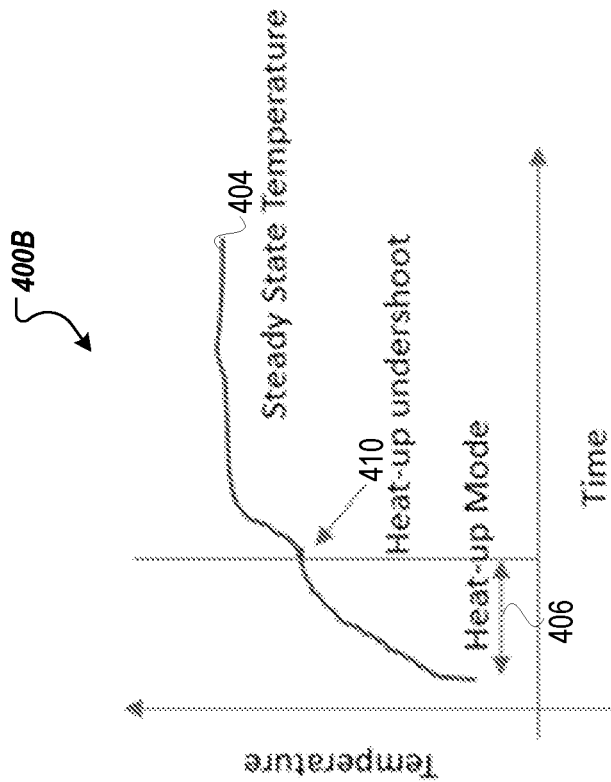
FIGS. 4A-B depicts graphs illustrating the temperature of a radar unit during a heat-up mode, according to at least one embodiment of the present disclosure.
Figure 4A:
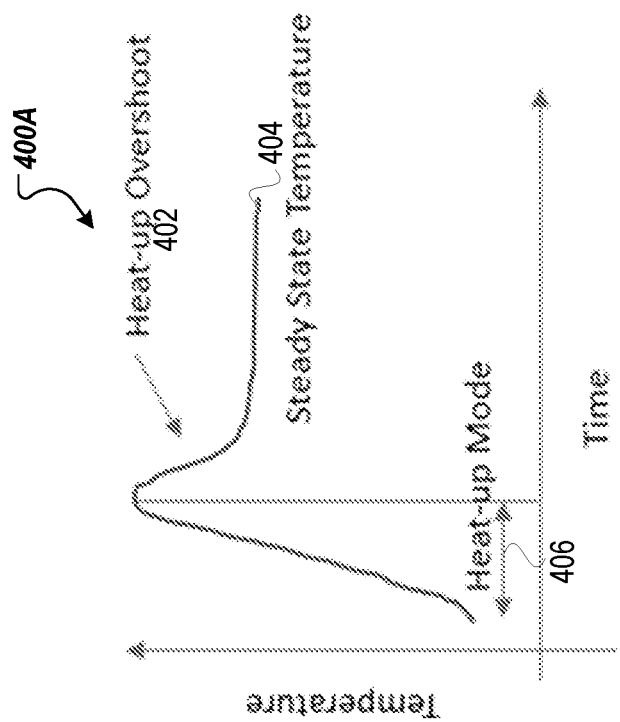

FIGS. 4A-B depicts graphs 400A-B illustrating the temperature of a radar unit during a heat-up mode 406, according to at least one embodiment of the present disclosure. FIG. 4A illustrates an example of a heat-up mode 406 resulting in heat-up overshoot 402. FIG. 4B illustrates an example of a heat-up mode undershoot 410. An overshoot 402 occurs when the heat-up mode concludes with the internal operating temperature above a steady-state temperature 404. An undershoot occurs when the heat-up mode concludes with the internal operating temperature below a steady-state temperature 404. Steady-state generally indicates an unvarying condition in a physical process. The steady-state of a radar chip, as used herein, is a condition of the radar chip to maintain a generally consistent temperature (e.g., within 1%, 5%, 10%) while in an operative state.

The drawback with threshold time duration based heating modes (e.g., process 250) is that the temperature can overshoot or undershoot the steady-state temperature resulting in the AGC being triggered every time the temperature changes by threshold margin (e.g., 5° C.). In FIG. 4A, as the heat-up mode results in an overshoot from the steady-state temperature, the AGC will need to be triggered multiple times before it reaches the steady-state. Each AGC trigger lasts a duration of time that the radar may be incapable of performing normal operations to recalibrate.

In an embodiment, when the radar can transmit power, it first needs to fix on a voxel. Every time the AGC is triggered, the radar stops transmitting, and there is a possibility the radar loses that control over that voxel. Since the AGC can be triggered multiple times over a short period when overshoots and undershoots occur, that radar will likely lose control over that voxel, increasing the downtime of the radar by an additional amount until the radar can reacquire the voxel and resume gathering data that can be utilized for sleep tracking.

Figure 5:
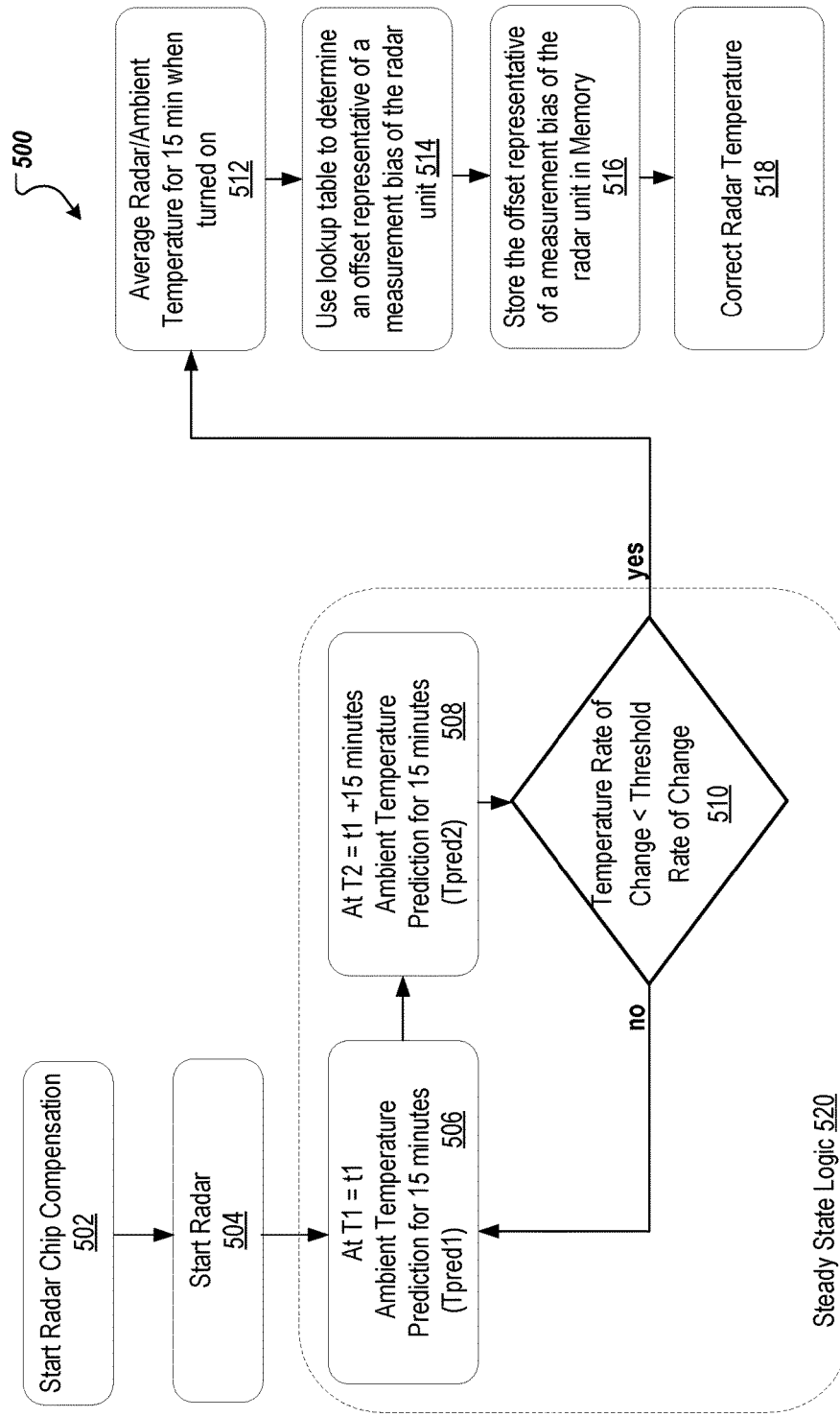
FIG. 5 depicts a flow diagram of a method for determining temperature measurement bias of a radar unit, according to at least one embodiment of the present disclosure.

FIG. 5 depicts a flow diagram of a method 500 for determining an offset representative of a measurement bias of the radar unit according to at least one embodiment of the present disclosure. Method 500 may be performed, at least in part, by processing logic that may include hardware (e.g., circuitry, dedicated logic, programmable logic, microcode, processing device, etc.), software (such as instructions run on a processing device, a general-purpose computer system, or a dedicated machine), firmware, microcode, or a combination thereof. Method 500 may be implemented by one or more of a radar unit and a host device (e.g., processor 162, client device 114), sometimes referred to as a host.

In some embodiments, method 500 is performed after setting up a radar unit and operating the radar for a fixed time duration beyond a time duration threshold associated with attaining a steady-state internal operating temperature of the radar unit. For example, a radar may be operational for a period of time (e.g., an hour) associated with the radar unit entering a steady-state conditions.

At block 502, processing logic starts radar unit compensation. For example, a processor may send instructions to the radar unit to perform radar unit compensation to determine an offset representative of a measurement bias of the radar unit.

At block 504, processing logic starts an operating mode of a radar unit. The operating mode is associated with the radar chip transmitting and acquiring radar data. The operating mode may include a simulation mode where operations of the radar are simulated, but data is not stored or processed beyond a simulation processing loop.

At block 506, processing logic determines a first ambient temperature prediction. As described previously, ambient temperature, according to some embodiments, represents a temperature of the surrounding air or environment in which the monitoring device resides (e.g., while the device is on). Ambient temperature may include the temperature of one or more elements of the monitoring device 103 as well as the surrounding environment. The first temperature prediction, $T_{pred1}$, may occur are on a first predetermine cadence (e.g., every 15 minutes a temperature prediction occurs).

At block 508, processing logic determines a second ambient temperature prediction and a fixed time duration from determining the first ambient temperature prediction. The second temperature prediction, $T_{pred2}$, may occur on a first predetermine cadence (e.g., every 15 minutes a temperature prediction occurs).

Figure 6:
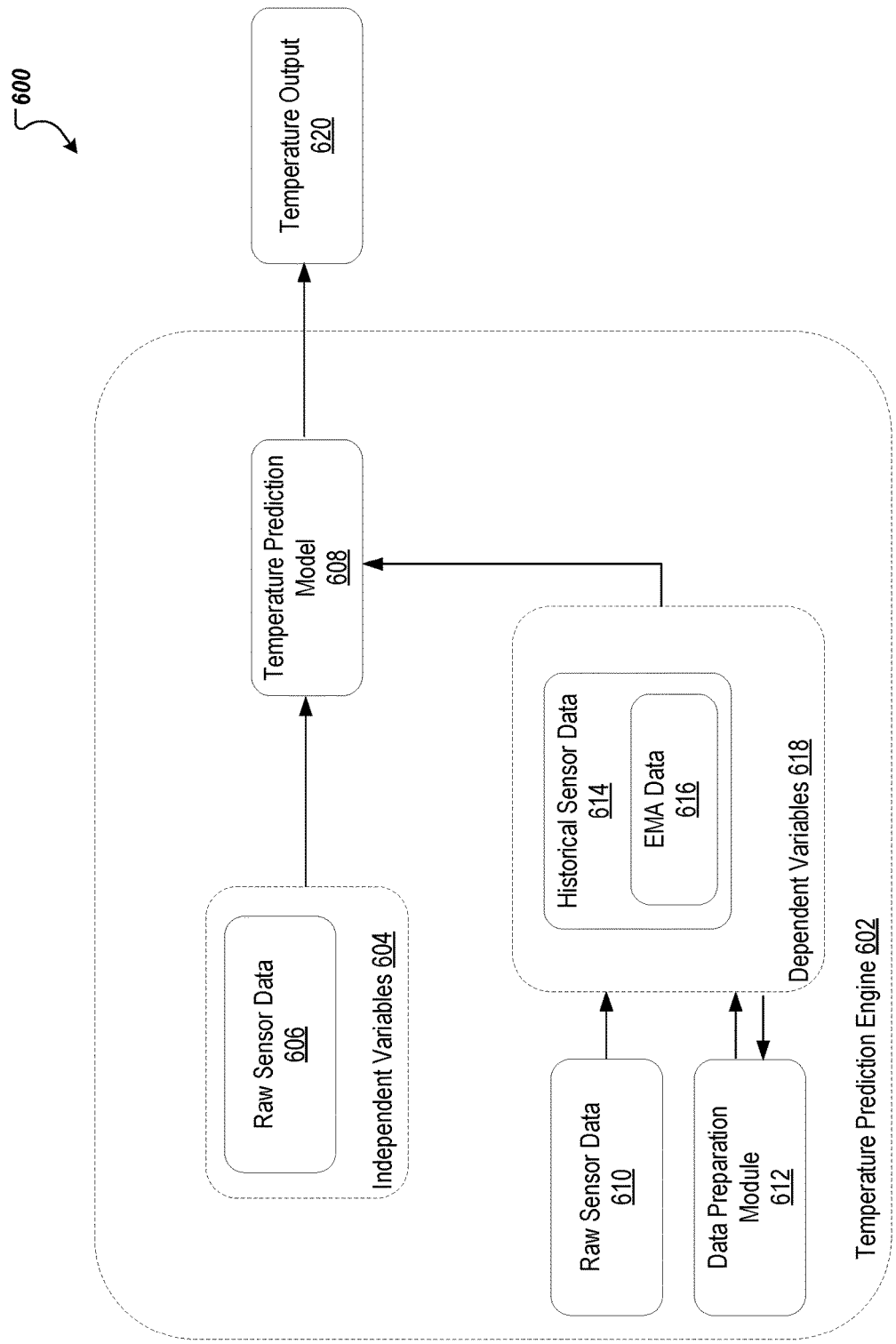
FIG. 6 is a block diagram that illustrates an ambient temperature sensing (ATS) system, according to at least one embodiment of the present disclosure.

In some embodiment, the first temperature prediction and the second temperature prediction are determined using one or more details described in FIG. 6. For example, the first temperature prediction and the second temperature prediction may be determined using a temperature prediction model such as a linear model or a machine-learning model such as a neural network.

At block 510, processing logic determines whether a temperature rate of change is less than the threshold rate of change. Responsive to determining that the temperature rate of change is less than the threshold rate of change, processing logic proceeds along the yes path to block 512. Responsive to determining that the threshold rate of change is not below a threshold rate of change (e.g., greater than or equal to), processing logic proceeds along the no path to block 506 and further ambient temperature predictions are determined.

At block 512, processing logic determines a set of values representative of the ambient temperature of the radar unit and the internal operating temperature of the radar unit between the first time and the second time associated with the first temperature prediction at block 506 and the second temperature prediction at block 508, respectively. The set of values may include a first value that indicates an average ambient temperature of the radar unit between the first time and the second time. The set of values may include a second value that indicates an average internal operating temperature of the radar unit between the first time and the second time.

At block 514, processing logic leverages relationship data (e.g., based on a lookup table) to determine an offset representative of a measurement bias of the radar unit measuring internal operating temperature. For example, as indicated previously, in some embodiments, the relationship data associates ambient temperature of a region monitored by the radar unit to internal operating temperature of the radar unit using a conversion formula such as, for example, one or more mathematical operations. The conversion formula may include one or more mathematical operations (e.g., a regression formula) to convert an ambient temperature of the region monitored by the radar unit to an internal operating temperature of the radar unit. In some embodiments, the relationship data may be stored in a data structure having key value pairs. The key of each key value pair may include an ambient temperature of a region monitored by the radar unit and the value of each kay value pair may include a corresponding internal operating temperature of the radar unit corresponding to the steady-state condition. For example, the data structure may include a relationship table (e.g., a look-up table) that stores values (e.g., temperature values) that can be accessed by the host device to configure the radar chip. For example, the relationship table may include one or more aspects of Table 1 discussed previously.

In some embodiments, processing logic may use the ambient temperature with the relationship table to determine a steady-state internal operating temperature associated with the determined ambient temperature. In some embodiments, the relationship data is stored as a model (e.g., a mechanistic, statistical, or machine-learning model). For example, any linear regression, nonlinear regression, exponential regression, least square regression, and/or any combination thereof can be used with historical data (e.g., historical ambient temperature and historical steady-state internal operating temperature, temperature of corresponding monitored regions of a selection of radar units) to generate a relationship model. In another example, statistical modeling can analyze historical data to determine a correlation between ambient temperature and the steady-state internal operating temperature. Processing logic may determine (e.g., predict) an ambient temperature of the radar chip. For example, the host device may direct temperature sensing hardware (e.g., temperature sensing hardware 195 of FIG. 1) to acquire sensor data indicating a state of an ambient environment of the radar unit. Processing logic may determine the ambient temperature using the sensor data. For example, processing logic may determine the ambient temperature using a linear model.

In some embodiments, the relationship data may include an indication of an expected internal operating temperature of the radar unit temperature for a given ambient temperature (e.g., a temperature of a region monitored by the radar unit). The expected internal operating temperature is representative of the internal operating temperature when the radar unit operates in a steady-state condition. As discussed previously, a steady-state condition may occur after a radar unit has been operational for a threshold amount of time (e.g., 30 sec, 1 min, and so forth) such that, for example, the temperature of the radar unit does not fluctuate or deviate beyond a certain temperature range (e.g., within 0.5 of a Degree). As previously described, the ambient temperature may be acquired using temperature sensing hardware to measure the temperature of a region monitored by a radar unit, referred to as the ambient temperature.

Processing logic may use the relationship data to determine an expected ambient temperature corresponding to a provided ambient temperature measurement. For example, processing logic determines an average ambient temperature of the radar unit at block 512. The average ambient temperature may be used with the relationship table to determine an expected internal operating temperature of the radar unit. As discussed previously, the radar unit includes temperature sensing hardware of the radar unit that measures an internal operating temperature of the radar unit while in the steady-state condition. Processing logic may determine a difference between the expected internal operating temperature and the measured internal operating temperature. The difference between the expected internal operating temperature and the measured internal operating temperature may be representative of a measurement bias of the temperature sensing unit of the radar unit. Processing logic determines an offset equal to the difference. The offset can be used to update a measured internal operating values to improve accuracy by accounting for the measurement bias of the radar unit.

In some embodiments, a measurement bias relates to differences in measured internal operating temperatures of multiple radar units under similar ambient conditions. Such differences in the measured internal operating temperatures may be due to manufacturing differences (e.g., defects) between radar units, temperature sensing deficiencies such as, for example, faults in the calibration of a temperature sensing, and/or other such limitations that prevent the radar unit from measuring the internal operating temperature accurately.

In some embodiments, the radar unit may include a current sensor, as described previously. The current sensor measures current delivered to the radar unit when the radar unit is performing one or more operations described herein. For example, at block 506, processing logic may determine a first current value at a first time using the current sensor. At block 508, processing logic may determine a second current value at a second time using the current sensor. At block 512 processing logic may determine an average current during a period of time when the radar unit is performing steady-state logic 520.

Processing logic may leverage current measurements to further associate ambient temperature of the radar unit to expected internal operating temperature of the radar unit. For example, process logic may determine a difference between a measured ambient temperature and expected internal operating temperature. Processing logic may identify a measured current delivered to the radar unit that is measured in temporally proximity to the measured ambient temperature. The measured current, measured ambient temperature, and expected internal operating temperature may form an individual data point of the broader relationship between the current, ambient temperature, and expected internal operating temperature. The above process of measuring ambient temperature, current delivered to the radar unit, and determining an expected internal operating temperature may be performed multiple time to determine a relationship between the identified temperature difference (between measured ambient temperature and expected internal operating temperature) and the current delivered to the radar unit. The relationship between the identified temperature different and the current delivered to the radar unit may be stored as a table, as shown in Table 2 below.

As shown in Table 2, a first column indicates a temperature difference between the measured ambient temperature and the expected internal operating temperature. A second column indicates a measured current delivered to the radar unit. Processing logic may determine a measurement bias of a radar unit using the values in Table 2. An exemplary process flow using table 2 to determine the measurement bias may include the following actions. Processing logic may determine an ambient temperature value of the radar unit and a value of the current delivered to the radar unit that is temporally related (e.g., the ambient temperature value and the value of the current characterize a state of the radar unit and an environment of the radar unit simultaneous one to another) to the ambient temperature value. Process logic may determine using the measured current and the relationship data, a corresponding temperature difference value. The corresponding temperature difference value may be applied to (e.g., substrate to/from) the ambient temperature to determine the expected internal operating temperature. Processing logic may determine a measured internal operating temperature (e.g., using temperature sensing hardware to measure the internal operating temperature) of the radar unit that is temporally related to the ambient temperature and the measured current. Processing logic may determine a difference between the measured internal operating temperature and the predicted internal operating temperature to determine an offset representative of the measurement bias of the radar unit.

TABLE 2

| Temperature Difference (° C.) | Measured Current (Amp) |
| --- | --- |
| 15 | 0.27 |
| 17 | 0.29 |
| 19 | 0.31 |
| 21 | 0.33 |
| 23 | 0.35 |
| 25 | 0.37 |
| 27 | 0.39 |
| 29 | 0.41 |
| 31 | 0.43 |
| 33 | 0.45 |
| 35 | 0.47 |
| 37 | 0.49 |
| 40 | 0.51 |

At block 516, processing logic stores the offset representative of the measurement bias. As discussed previously, the measurement bias indicates a difference between a measured internal operating temperature and an expected internal operating temperature for a given radar unit. The offset may be stored and used in block 518 to update measurements of internal operating temperature that account for the determine measurement bias of the radar unit. The previously determined offset (e.g., in block 514) may be stored locally (e.g., bias data 143 on memory 140) and quickly accessed to update future measurements to account for the previously determined measurement bias of the radar unit. In some embodiments, the offset is stored remotely (e.g., storage 116) and accessed through a network (e.g., network 110, 112).

At block 518, processing logic corrects one or more internal operating temperature measurements using the offset stored in memory. As discussed in other embodiments, the internal operating temperature may be used as an end condition for an operational mode of the radar unit such as, for example, a heat up mode. To effectively use a temperature-based end condition, the measured temperature parameter (e.g., internal operation temperature) needs to be accurately represented. For example, comparing an inaccurate temperature measurement with a precise temperature condition may cause the system to overshoot or undershoot the actual desired internal operating temperature. The previously determined offset accounts for the measurement bias of the radar chip, and when applied improves the accuracy of the measured temperature value. Use of the offset to measured internal operating temperature may occur during a heat-up mode of the radar unit, as described in associated with FIG. 2.

FIG. 6 is a block diagram illustrating an ambient temperature sensing (ATS) system 600, according to at least one embodiment. The ATS system may include a temperature prediction engine 602. The temperature prediction engine 602 may include details described in association with temperature prediction engine 163 of FIG. 1. In some embodiments, the temperature prediction engine 602 leverage a temperature prediction model 608 (e.g., statistical model, machine-learning models, deterministic models, etc.) stored locally or accessed through a network (e.g., network 110, 112 of FIG. 1 such as a cloud service) to predict a temperature from measured sensor data (e.g., electrodynamic measurement such as current, resistance, power, etc.).

The temperature prediction engine 602 may direct temperature sensing hardware (e.g., temperature sensing hardware 195 of FIG. 1) to acquire raw sensor data 606, 610. The raw sensor data 606, 610 may include data indicating a state of an ambient environment of a radar unit such as monitoring device 103 of FIG. 1. The raw sensor data may include electrodynamic measurements such as current, resistance, power, etc., reflective of an ambient temperature.

The sensor data 606, 610 may include data corresponding to an ambient temperature. For example, the temperature sensing hardware may include one or more of thermistors and/or i2c temperature sensors, among other sensors. Thermistors are a type of a resistor whose resistance is strongly dependent on temperature. Negative temperature coefficient (NTC) thermistors' resistance decreases with temperature, while positive temperature coefficient (PTC) thermistors' resistances increase with temperature. To obtain temperature, NTCs may be connected in parallel with a resistor to create a voltage divider circuit. When the temperate changes, the resistance across this circuit changes resulting in a change in the voltage drop across the thermistor. An analog to digital converted (ADC) measures this voltage drop, and since the thermistor is connected with a known fixed resistance, the resistance change of the thermistor can be calculated. The tolerance of these resistors chosen or the accuracy of the ADC measurements can affect the accuracy of the reading. An i2c temperature sensor is a digital temperature sensor that may generally be more accurate than NTC/PTC sensors but more costly in one or more of size, energy, and commercial cost.

In some embodiments, raw sensor data 606 and raw sensor data 610 include the same or overlapping sensor. In some embodiments, raw sensor data 606 and raw sensor data 610 include mutually exclusive sensor data. For example, raw sensor data 606 may correspond to data acquired using a first selection of temperature sensing hardware, and raw sensor data 610 may correspond to data acquired using a second selection of temperature sensing hardware.

The temperature prediction engine may include a data preparation module 612. The data preparation module 612 may perform one or more data pre-processing steps to refine the data for use in the temperature prediction model and/or to generate (e.g., perform a regression, train a machine-learning model, etc.). For example, the data preparation module one or functions associated with feature extraction. Feature extractors can dimensionally reduce the raw sensor data into groups or features. For example, the feature extractor may generate features that include the rate of change of a parameter value (e.g., a historical rate of change such as one or more of a simple, exponential, and/or weighted moving average of the raw sensor data) and/or a collection of parameters value. In some embodiments, data preparation module 612 performs any of partial least squares analysis, principal component analysis, multifactor dimensionality reduction, nonlinear dimensionality reduction, and/or any combination thereof. In some embodiments, the feature extractor is designed for edge detection of the raw sensor data. For example, the data preparation module 612 includes a methodology that aims to identify data points that change sharply and/or have discontinuities—for example, the slope of a resistance measurement of a thermistor sensor.

In some embodiments, the data preparation module 612 may determine the exponential moving average (EMA) data 616 associated with the raw sensor data 610. The temperature prediction engine leverages information about past or historical data (e.g., EMA data 616) to determine a current or present ambient temperature. An EMA indicates a trend direction of the sensor over time. Storing historical sensor information can be very expensive. The EMA data compacts the amount of space needed to track historical sensor data. For example, in some embodiments, exponential moving averages (EMAs) can permit the storage of temporal historical information with less than 50 bytes in memory. Equation 1 below shows an exemplary implementation of an EMA where $Y_i$, $S_{t-1}$ and $S_t$ and represents the raw signal, EMA at t–1 and t, respectively, where t represents an instance of time, and N represents a ratio of the time period over sample rate.

$$S_t = \begin{cases} Y_i, t = 1 \\ \alpha Y_i + (1-\alpha)S_{t-1}, t > 1 \end{cases} \alpha = \frac{2}{N+1} \qquad \text{Equation 1}$$

As shown in FIG. 6, the temperature prediction engine 602 includes independent variables 604 and dependent variables 618 as input to a temperature prediction model 608. Independent variables 604 include the raw sensor data 606, and dependent variables 618 include EMA analysis applied on the raw sensor data 610. The temperature prediction model 608 receives independent variables 604 and dependent variables 618 and determines temperature output 620. Temperature output 620 indicates a prediction of a temperature associated with raw sensor data 606 and raw sensor data 610. For example, temperature output 620 indicates an ambient temperature prediction of a radar unit.

In some embodiments, the temperature prediction model 608 includes a mechanistic model determined using regression analysis between historical data (e.g., historical representations of independent variables 604 and dependent variables 618). For example, any of linear regression, nonlinear regression, exponential regression, least square regression, and/or any combination thereof can be used to generate the mechanistic model. In some embodiments, the mechanistic model identifies multiple physical dependencies between the data and generates various predicted values associated with the raw sensor data 606, 610 and the physical dependencies. In some embodiments, the model can be used to output predictions (e.g., a future or expected value and/or a current parameter value difficult to obtain), updated data values (e.g., calibrate data points), and/or relationships between the individual data points (e.g., a regression equation and/or trend line).

In some embodiments, the temperature prediction model 608 includes a statistical model. In some embodiments, the statistical model is generated using statistical process control (SPC) analysis to determine control limits for data and identify data as being more or less dependable based on those control limits. In some embodiments, the statistical model is associated with univariate and/or multivariate data analysis of historical representations of the independent variables 604 and the dependent variables 618. For example, various parameters can be analyzed using the statistical model to determine patterns and correlations through statistical processes (e.g., range, minimum, maximum, quartiles, variance, standard deviation, and so on). In another example, relationships between multiple variables can be ascertained using regression analysis, path analysis, factor analysis, multivariate statistical process control (MCSPC), and/or multivariate analysis of variance (MANOVA).

In some embodiments, the temperature prediction model 608 includes a machine-learning model. One type of machine learning model that may be used to perform ATS is an artificial neural network, such as a deep neural network or a graph neural network (GNN). Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g., classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation.

In a temperature prediction model, for example, the raw input (e.g., into the first set of layers) may be sensor data associated with a state of an ambient environment; a second set of layers may compose processed sensor data (e.g., EMA data 616); a third set of layers may include encoded image data (e.g., feature vectors) associated with a state of the ambient environment. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different from the ones present in the training dataset.

Training of the one or more machine learning models may be performed using one or more training datasets containing a number (e.g., hundreds, thousands, millions, tens of millions or more) of sensor measurements (e.g., temperature sensing hardware 195) and EMA data points. In some embodiments, the training dataset may also include a number of ambient temperature measurements, where each ambient temperature measurement is associated with a combination of sensor measurement and EMA data points. The machine learning models may be trained, for example, to generate outputs indicating ambient temperature predictions associated with sensor data and EMA data points corresponding to a state of an ambient environment of a radar unit.

Figure 7:
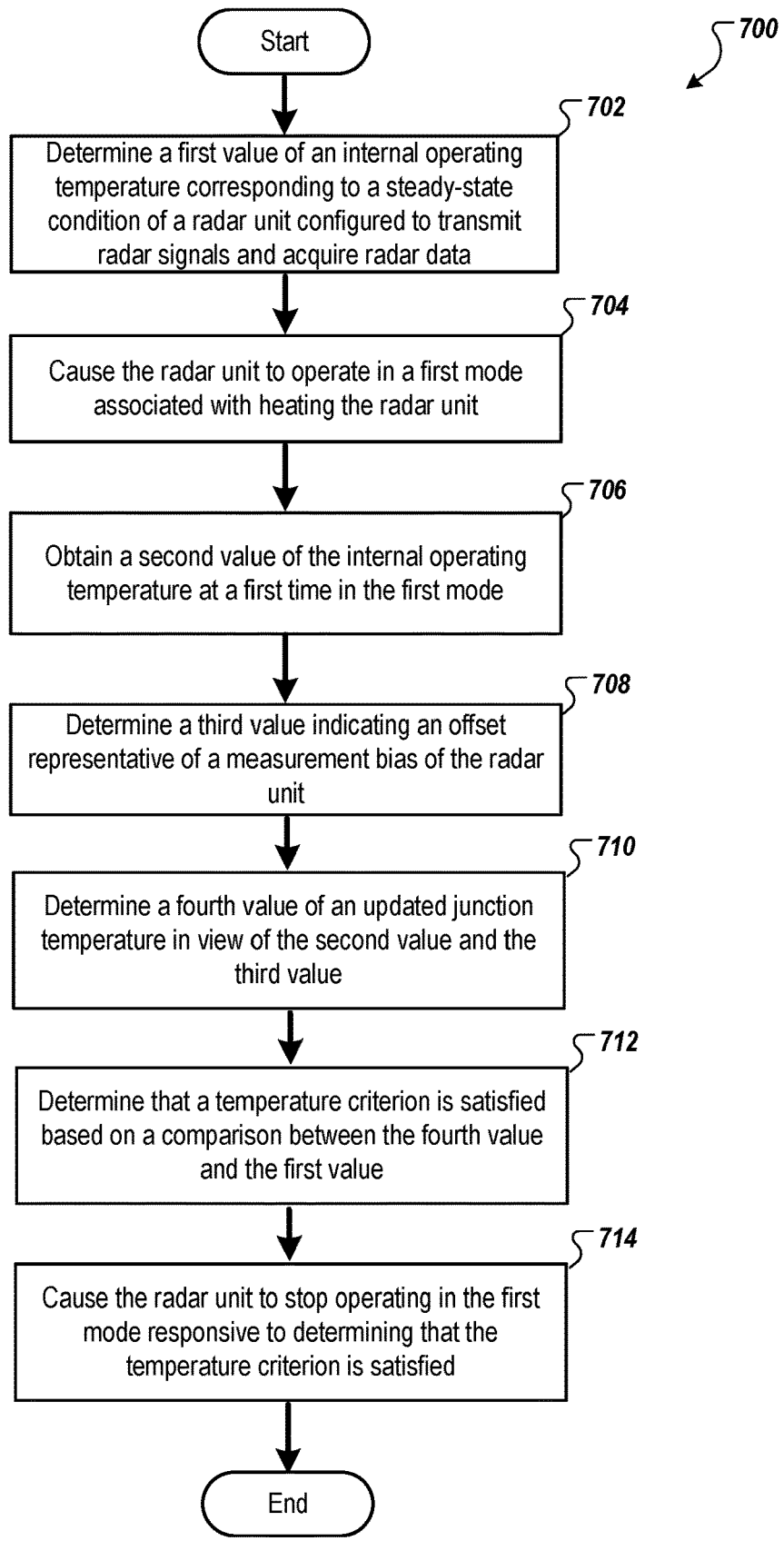
FIG. 7 is a flow diagram of a method for temperature gain control, according to at least one embodiment of the present disclosure.

FIG. 7 is a flow diagram of a method 700 for temperature gain control according to at least one embodiment. Method 700 may be performed, at least in part, by processing logic that may include hardware (e.g., circuitry, dedicated logic, programmable logic, microcode, processing device, etc.), software (such as instructions run on a processing device, a general-purpose computer system, or a dedicated machine), firmware, microcode, or a combination thereof. Method 700 may be implemented, for example, by one or more of a radar unit and a host device (e.g., processor 162, client device 114), or sometimes referred to as a host.

At block 702, processing logic determines a first value of an internal operating temperature corresponding to a steady-state condition of a radar unit configured to transmit radar signals and acquire radar data. Steady-state generally indicates an unvarying condition in a physical process. The steady-state of a radar chip, as used herein, is a condition of the radar chip to maintain a generally consistent temperature (e.g., within 1%, 5%, 10%) while in an operative state. Details regarding steady-state are further discussed in FIG. 4.

In some embodiments, the internal operating temperature is associated with an operating temperature of one or more elements of an electronic device such as a monitoring device (most commonly the radar unit or components of the radar). The internal operating temperature, which can also be indicated as the transistor junction temperature, includes the maximum operating temperature of a semiconductor in use in an electronic device (e.g., monitoring device 103 of FIG. 1).

In some embodiments, processing may further obtain a fifth value of an ambient temperature of the radar unit. Processing logic may further retrieve, from memory corresponding to the radar unit, first data indicating a relationship between the ambient temperature and internal operating temperature corresponding to the steady-state of the radar unit. The first value may be determined using the fifth value and the first data.

In some embodiments, the first data is a relationship table (e.g., a look-up table) that stores values that can be accessed by the host device to configure the radar chip. For example, processing logic may determine an ambient temperature corresponding to the radar chip. Processing logic may use the ambient temperature with the relationship table to determine a steady-state internal operating temperature associated with the determined ambient temperature. In some embodiments, the relationship data is stored as a model (e.g., a mechanistic, statistical, or machine-learning model). For example, any of linear regression, nonlinear regression, exponential regression, least square regression, and/or any combination thereof can be used with historical data to generate a relationship model. In another example, statistical modeling can analyze historical data to determine a correlation between ambient temperature and the steady-state internal operating temperature.

At block 704, processing logic causes the radar unit to operate in a first mode associated with heating the radar unit.

Details of the first mode are discussed further in FIGS. 2A-B. At block 706, processing logic obtains a second value of the internal operating temperature at a first time in the first mode.

At block 708, processing logic determines a third value indicating an offset representative of a measurement bias of the radar unit. The temperature correction may be calculated using one or more features described in association with FIG. 5. At block 710, processing logic determines a fourth value of an updated internal operating temperature in view of the second value and the third value.

In some embodiments, the processing logic is further to cause the radar unit to operate in a second mode associated with transmitting radar signals and acquiring radar data. The processing logic further obtains a fifth value of an ambient temperature of the radar unit at a second time in the second mode. Processing logic obtains a sixth value of the ambient temperature of the radar unit at a third time in the second mode. Processing logic determines a seventh value in view of the fifth value, the sixth value, the second time, and the third time. The seventh value indicates a rate of change of the ambient temperature of the radar unit between the first time and the second time. Processing logic responsive to determining that the seventh value meets a temperature rate of change criterion, determine a first set of values representative of the ambient temperature of the radar unit and the junction temperature of the radar unit between the first time and the second time. The third value is determined further using the first set of values.

In some embodiments, the first set of values includes an eighth value and a ninth value. The eighth value indicates an average ambient temperature of the radar unit between the first time and the second time. The ninth value indicates an average internal operating temperature (e.g., average junction temperature) of the radar unit between the first time and the second time. The third value may be determined further using the seventh value and the eighth value.

In some embodiments, processing logic obtains first data indicating a relationship between the ambient temperature and corresponding steady-state junction temperature associated with the radar unit. The first data may include a look-up table stored in memory corresponding to the radar unit. The third value may be determined further in view of the first data.

At block 712, processing logic determines that a temperature criterion is satisfied based on a comparison between the fourth value and the first value. In some embodiments, the temperature criterion is associated with the steady-state junction temperature of the radar unit. For example, the radar unit may include a dynamic operational range. The steady-state temperature may include a value within the dynamical operational range. At block 714, processing logic causes the radar unit to stop operating in the first mode responsive to the determining that the temperature criterion is satisfied.

In some embodiments, the processing logic further causes the radar unit to perform a calibration procedure corresponding to radar signal gain control. Processing logic receives a fifth value of the junction temperature at a second time during the calibration procedure. The fifth value indicates the completion of the calibration procedure.

In some embodiments, the calibration procedure includes determining an effective isotropic radiated power (EIRP) value corresponding to one of a set of gain states of the radar unit. The calibration procedure may include selecting a first gain state from the set of gain states based on a corresponding EIRP value. The calibration procedure further includes configuring the radar unit to perform radar operation using the first gain state.

In some embodiments, processing logic further causes the radar unit to operate in a second mode associated with transmitting radar signals and acquiring radar data. Details of the second mode are discussed further in FIG. 3. Processing logic obtains a sixth value of the junction temperature in the second at a third time in the second mode. Processing logic determines a difference between the sixth value and the fifth value that meets a temperature change criterion. Processing logic causes the radar unit to conclude operating in the second mode.

In some embodiments, responsive to determining the difference meets the temperature change criterion, processing logic causes the radar unit to perform the calibration procedure. Processing logic receives a seventh value of the junction temperature at a fourth time during the calibration procedure, the seventh value indicates the completion of the calibration procedure.

In some embodiments, processing logic causes the radar unit to operate in a second mode associated with transmitting radar signals and acquiring radar data. Processing logic may obtain radar data at a second time in the second mode. The radar data may indicate a respiratory rate of a user (e.g., located within a monitoring area).

Figure 8:
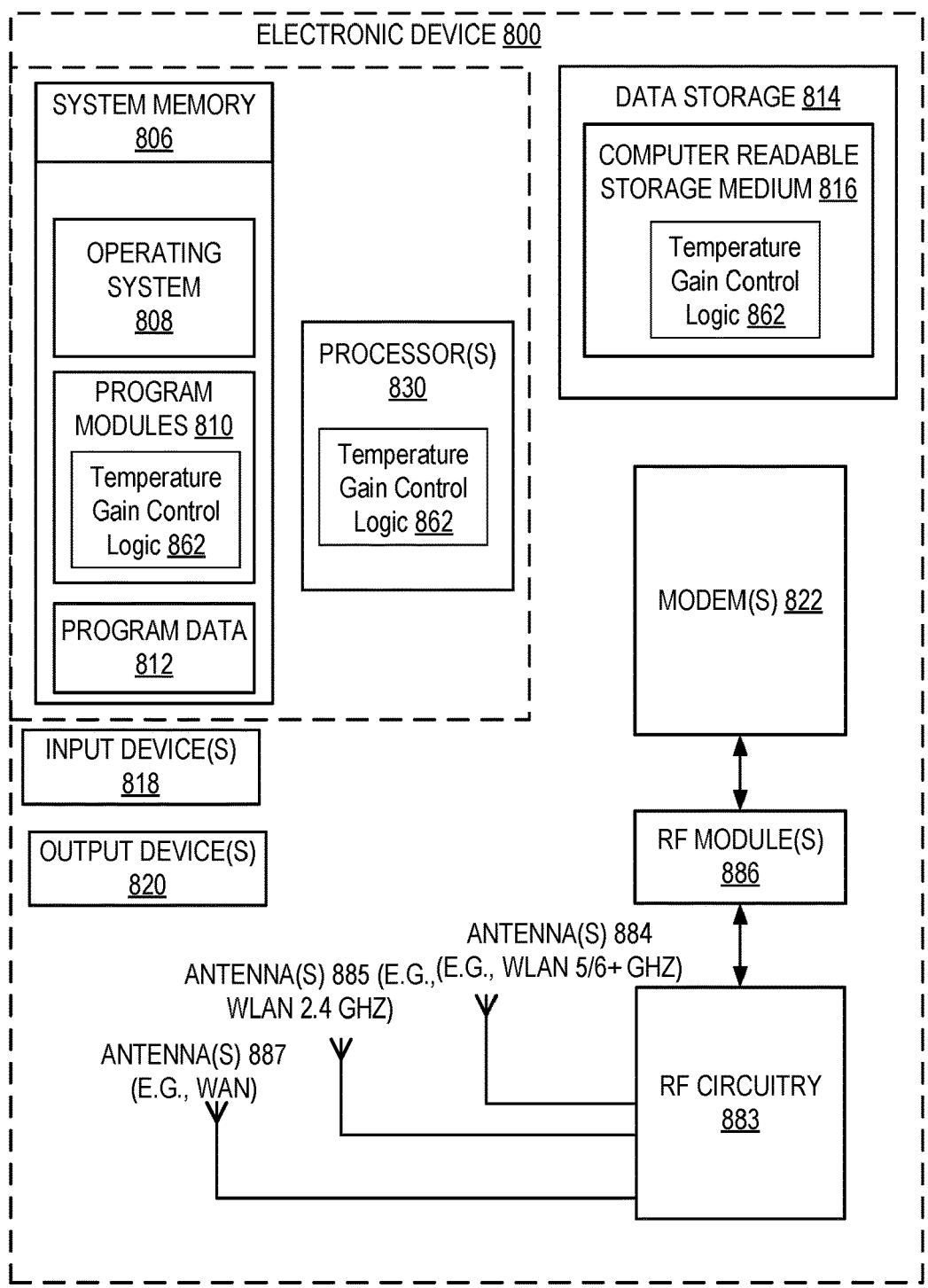
FIG. 8 is a block diagram of an electronic device with temperature gain control logic, according to at least one embodiment of the present disclosure.

FIG. 8 is a block diagram of an electronic device 800 with temperature gain control logic 862, according to one embodiment. The electronic device 800 may correspond to the user devices described herein. The electronic device 800 includes one or more processor(s) 830, such as one or more CPUs, microcontrollers, field-programmable gate arrays, or other types of processors. The electronic device 800 also includes system memory 806, which may correspond to any combination of volatile and/or non-volatile storage mechanisms. The system memory 806 stores information that provides operating system component 808, various program modules 810, program data 812, and/or other components. The program modules 810 may include instructions of the temperature gain control logic 862. The temperature gain control logic 862 can perform any of the operations described herein. In one embodiment, the system memory 806 stores instructions of methods to control the operation of the electronic device 800. The electronic device 800 performs functions by using the processor(s) 830 to execute instructions provided by the system memory 806.

The electronic device 800 also includes a data storage device 814 that may be composed of one or more types of removable storage and/or one or more types of non-removable storage. The data storage device 814 includes a computer-readable storage medium 816 on which is stored one or more sets of instructions embodying any of the methodologies or functions described herein. Instructions for the program modules 810 may reside, completely or at least partially, within the computer-readable storage medium 816, system memory 806 and/or within the processor(s) 830 during execution thereof by the electronic device 800, the system memory 806, and the processor(s) 830 also constituting computer-readable media. The electronic device 800 may also include one or more input devices 818 (keyboard, mouse device, specialized selection keys, etc.) and one or more output devices 820 (displays, printers, audio output mechanisms, etc.).

The electronic device 800 further includes a modem 822 to allow the electronic device 800 to communicate via wireless connections (e.g., provided by the wireless communication system) with other computing devices, such as remote computers, an item providing system, and so forth. The modem 822 can be connected to one or more RF modules 886. The RF modules 886 may be a WLAN module, a WAN module, a personal area network (PAN) module, a GPS module, or the like. The antenna structures (antenna(s) 884, 885, and 887) are coupled to the RF circuitry 883, which is coupled to the modem 822. The RF circuitry 883 may include radio front-end circuitry, antenna switching circuitry, impedance matching circuitry, or the like. In one embodiment, the RF circuitry 883 includes the RFFE circuitry with high selectivity performance as described in the various embodiments of FIGS. 1-7. The antennas 884 may be GPS antennas, NFC antennas, other WAN antennas, WLAN or PAN antennas, or the like. The modem 822 allows the electronic device 800 to handle both voice and non-voice communications (such as communications for text messages, multimedia messages, media downloads, web browsing, etc.) with a wireless communication system. The modem 822 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 822 may generate signals and send these signals to antenna(s) 884 of a first type (e.g., WLAN 5/6+ GHz), antenna(s) 885 of a second type (e.g., WLAN 2.4 GHz), and/or antenna(s) 987 of a third type (e.g., WAN), via RF circuitry 883, and RF module(s) 886 as described herein. Antennas 884, 885, and 887 may be configured to transmit in different frequency bands and/or using different wireless communication protocols. The antennas 884, 885, and 887 may be directional, omnidirectional, or non-directional antennas. In addition to sending data, antennas 884, 885, and 887 may also receive data, which is sent to appropriate RF modules connected to the antennas. One of the antennas 884, 885, 887 may be any combination of the antenna structures described herein.

In one embodiment, the electronic device 800 establishes a first connection using a first wireless communication protocol and a second connection using a different wireless communication protocol. The first wireless connection and second wireless connection may be active concurrently, for example, if an electronic device is receiving a media item from another electronic device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band. The second wireless connection is associated with a second resonant mode of the antenna structure that operates at a second frequency band. In another embodiment, the first wireless connection is associated with a first antenna structure, and the second wireless connection is associated with a second antenna.

Though a modem 822 is shown to control transmission and reception via antenna (884, 885, 887), the electronic device 800 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device, comprising:
   a radar unit that operates in a millimeter-wave (mmWave) frequency range;
   a first temperature sensing unit coupled to the radar unit;
   a processing device coupled to the radar unit;
   a second temperature sensing unit coupled to the processing device; and
   a memory coupled to the processing device to store (i) information associating temperatures of a region monitored by the electronic device to internal operating temperatures of the radar unit corresponding to a steady-state condition and (ii) computer-executable instructions that, when executed, cause the electronic device to perform operations comprising:
      receive, from the second temperature sensing unit, a first value indicating a temperature of the region monitored by the electronic device;
      determine, using the first value and the information, a second value indicating an internal operating temperature corresponding to the steady-state condition;
      cause the radar unit to operate in a first mode in which a power consumption by the radar unit is increased from a first amount to a second amount to heat the radar unit;
      receive, from the first temperature sensing unit, a third value indicating the internal operating temperature at a first time in the first mode;
      determine a fourth value indicating a temperature measurement bias of the radar unit;
      determine, using the fourth value and the third value, a fifth value indicating an updated internal operating temperature of the radar unit at the first time;
      determine a threshold temperature condition is satisfied based on a comparison between the fifth value and the second value; and
      cause the radar unit to cease operating in the first mode.

2. The electronic device of claim 1, wherein the operations further comprise:
   cause the radar unit to operate in a second mode associated with transmitting radar signals and acquiring radar data;
   receive, from the second temperature sensing unit, a sixth value and a seventh value, wherein the sixth value indicates the temperature of the region monitored by the radar unit at a second time in the second mode, and wherein the seventh value indicates the temperature of the radar unit at a third time in the second mode;
   determine an eighth value based on the sixth value and the seventh value wherein the eighth value indicates a rate of change of the temperature of the region monitored by the radar unit; and
   responsive to determining that the eighth value meets a temperature rate of change criterion, determine a ninth value and a tenth value, wherein the ninth value indicates an average temperature of the region monitored by the radar unit between the second time and the third time, wherein the tenth value indicates an average internal operating temperature of the radar unit between the second time and the third time, and wherein the fourth value is determined further using the ninth value and the tenth value.

3. The electronic device of claim 1, wherein the operations further comprise:
   cause the radar unit to perform a calibration procedure corresponding to radar signal gain control;
   receive, from the first temperature sensing unit, a sixth value indicating the internal operating temperature of the radar unit at a second time associated with performing the calibration procedure;
   cause the radar unit to operate in a second mode associated with transmitting radar signals and acquiring radar data;
   receive, from the first temperature sensing unit, a seventh value indicating the internal operating temperature of the radar unit at a third time in the second mode;
   determine that a difference between the sixth value and the seventh value meets a temperature change criterion; and
   cause the radar unit to cease operating in the second mode.

4. A method comprising, by a monitoring device:
   determining a first value for an internal operating temperature of a radar unit of the monitoring device, wherein the first value corresponds to a steady-state condition of the monitoring device;
   causing the radar unit to operate in a first mode in which a power consumption by the radar unit is increased from a first amount to a second amount to heat the radar unit;
   obtaining a second value for the internal operating temperature at a first time in the first mode;
   determining a third value indicating a temperature measurement bias of the radar unit;
   determining, by applying the third value to the second value, a fourth value indicating an updated internal operating temperature of the radar unit at the first time;
   determining, a threshold temperature condition is satisfied based on a comparison between the fourth value and the first value; and
   causing the radar unit to stop operating in the first mode responsive to determining that the threshold temperature condition is satisfied.

5. The method of claim 4, further comprising:
   obtaining a fifth value for a temperature of a region monitored by the radar unit; and
   determining, using first data, the first value, the first data indicating a relationship between the temperature of the region monitored by the radar unit and the internal operating temperature of the radar unit corresponding to the steady-state condition.

6. The method of claim 4, further comprising:
   obtaining a fifth value for a current measurement associated with an integrated circuit of the radar unit; and
   determining the third value further using the fifth value.

7. The method of claim 5, wherein the first data is generated by performing a regression between second data and third data, the second data indicating historical temperature of corresponding monitored regions of a first set of radar units and the third data indicating corresponding historical steady-state internal operating temperatures associated with a first set of radar units.

8. The method of claim 4, further comprising:
   causing the radar unit to operate in a second mode, the second mode associated with transmitting and receiving data;

obtaining a fifth value for a temperature of a region monitored by the radar unit at a second time in the second mode;

obtaining a sixth value for the temperature of the region monitored by the radar unit at a third time in the second mode;

determining a seventh value based on the fifth value and the sixth value, wherein the seventh value indicates a rate of change of the temperature of the region monitored by the radar unit between the second time and the third time;

determining that the seventh value meets a temperature rate of change criterion; and determining (i) a first set of values representative of the temperature of the region monitored by the radar unit between the second time and the third time and (ii) a second set of values representative of the internal operating temperature of the radar unit between the second time and the third time, wherein the third value is determined further using the first set of values and the second set of values.

9. The method of claim 8, wherein:

the first set of values comprises an eighth value and the second set of values comprises a ninth value;

the eighth value indicates an average temperature of the region monitored by the radar unit between the second time and the third time; and the ninth value indicates an average internal operating temperature of the radar unit between the second time and the third time, wherein the method further comprises determining the third value further using the seventh value and the eighth value.

10. The method of claim 8, further comprising:

obtaining first data associating the temperature of the region monitored by the radar unit and corresponding internal operating temperature associated with the radar unit operating in the steady-state condition, wherein the third value is determined further using the first data.

11. The method of claim 4, further comprising:

determining an effective isotropic radiated power (EIRP) value corresponding to a first gain state of the radar unit;
and configuring the radar unit to perform radar operations using the first gain state.

12. The method of claim 4, further comprising:

causing the radar unit to perform a calibration procedure at a second time; and receiving a fifth value for the internal operating temperature at a third time;

causing the radar unit to operate in a second mode associated with transmitting radar signals and acquiring radar data;

obtaining a sixth value for the internal operating temperature at a fourth time in the second mode;

determining that a difference between the sixth value and the fifth value meets a temperature change criterion; and causing the radar unit to cease operating in the second mode.

13. The method of claim 12, further comprising:

responsive to determining that the difference meets the temperature change criterion, causing the radar unit to perform the calibration procedure at a fifth time.

14. A monitoring device, comprising:

a radar unit that operates in a millimeter-wave (mmWave) frequency range;

a processing device coupled to the radar unit; and a memory coupled to the processing device to store computer-executable instructions that, if executed, cause the monitoring device to perform operations comprising:

cause the radar unit to operate in a first mode in which a power consumption by the radar unit is increased from a first amount to a second amount to heat the radar unit;

responsive to determining that a first temperature value associated with the radar unit meets a threshold temperature condition, cause the radar unit to cease operating in the first mode and perform a calibration procedure at a first time;

determine a first signal amplification value for the radar unit based on the calibration procedure; and cause the radar unit to operate in a second mode, the second mode associated with transmitting and acquiring data using the first signal amplification value.

15. The monitoring device of claim 14, wherein the memory further stores a temperature measurement bias of the radar unit, wherein the operations further comprise:

obtain a second temperature value for an internal operating temperature of the radar unit at a second time in the first mode; and determine the first temperature value using the second temperature value and the temperature measurement bias, wherein the first temperature value further indicates an updated internal operating temperature of the radar unit.

16. The monitoring device of claim 15, wherein the radar unit comprises an integrated circuit, wherein the operations further comprise:

obtain a value for a current measurement associated with the integrated circuit; and determine the temperature measurement bias using the value for the current measurement.

17. The monitoring device of claim 14, wherein the first temperature value indicates an internal operating temperature of the radar unit and the threshold temperature condition is associated with the internal operating temperature corresponding to a steady-state condition of the radar unit.

18. The monitoring device of claim 14, wherein the operations further comprise:

obtain a second temperature value corresponding to the radar unit at a second time during the calibration procedure;

obtain a third temperature value corresponding to the radar unit at a third time in the second mode;

determine that a difference between the second temperature value and the third temperature value meets a temperature change criterion; and cause the radar unit to cease operating in the second mode.

19. The monitoring device of claim 18, wherein the operations further comprise:

responsive to determining that the difference meets the temperature change criterion, cause the radar unit to perform the calibration procedure at a fourth time.

20. The monitoring device of claim 14, wherein the operations further comprise:

determining an effective isotropic radiated power (EIRP) value corresponding to a first gain state of the radar unit;
and configuring the radar unit to perform radar operations using the first gain state, wherein the first gain state corresponds to the first signal amplification value.

* * * * *